United States Patent Office 3,523,939
Patented Aug. 11, 1970

3,523,939
5-(2,6-DISUBSTITUTED PHENYL)-1,4-BEN-ZODIAZEPINES AND METHODS FOR THEIR PREPARATION
Rodney Ian Fryer, North Caldwell, Leo Henryk Sternbach, Upper Montclair, and James Valentine Earley, Cedar Grove, N.J., assignors to Hoffmann-La Roche Inc., Nutley, N.J., a corporation of New Jersey
No Drawing. Filed July 3, 1967, Ser. No. 650,651
Int. Cl. C07d 53/06
U.S. Cl. 260—239       30 Claims

ABSTRACT OF THE DISCLOSURE 1,4-benzodiazepines and benzodiazepin-2-ones having a 2,6-di-suibstituted phenyl group in the 5-position wherein the phenyl group is substituted with at least one halogen, and a process for their production including intermediates in this process. These benzodiazepines and benzodiazepin-2-ones are useful as sedatives, psychosedatives, hypnotics, muscle relaxants and anticonvulsants.

SUMMARY OF INVENTION

In accordance with this invention, we have found that 5-(2,6-disubstituted phenyl)-1,4-benzodiazepines and benzodiazepin-2-ones selected from the group consisting of compounds of the formulae:

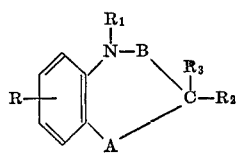

(I)

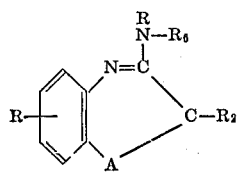

(I-A)

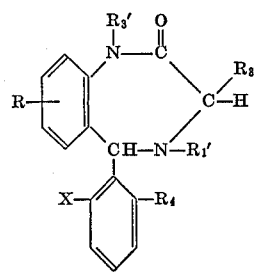

(I-B)

and pharmaceutically acceptable salts,
wherein A is selected from the group consisting of:

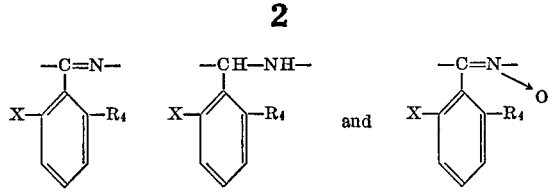

B is selected from the group consisting of—

and —$CH_2$—; X is a halogen; R is selected from the group consisting of hydrogen, halogen, nitro and trifluoromethyl; $R_1$ is selected from the group consisting of hydrogen, lower alkyl, lower alkanoyloxy and

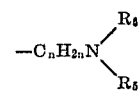

$R_2$ is selected from the group consisting of hydrogen, hydroxy, lower alkoxy, and lower alkanoyloxy; $R_3$ is selected from the group consisting of hydrogen and lower alkyl; $R_4$ is selected from the group consisting of halogen, hydroxy, lower alkoxy, alkyl amino, and thioalkyl; $R_5$ and $R_6$ are selected from the group consisting of hydrogen and lower alkyl and $R_5$ and $R_6$ together with their attached nitrogen atom form a 5 or 6 membered heterocyclic ring; $R_1'$ and $R_3'$ are lower alkyl; $n$ is an integer from 2 to 5 with the proviso that when $R_2$ is selected from the group consisting of lower alkoxy, lower alkanoyloxy, and hydroxy, A is:

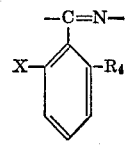

are very useful as hypnotics, psychosedatives, anticonvulsants, sedatives and muscle relaxants. The 5-(2,6-disubstituted phenyl) benzodiazepines and benzodiazepin-2-ones compounds of Formula I and I-A above, are highly activate as sedatives, psychosedatives, muscle relaxants, hypnotics and anticonvulsants. This activity is completely unexpected due to the fact that 5-(dihalosubstituted phenyl)benzodiazepine and benzodiazepin-2-ones isomers such as the 5-(2,4-dihalosubstituted phenyl)-benzodiazepin-2-ones, which are disclosed in Fryer et al., Journal of Med. Chem., 7386 (1964), were found to be completely inactive.

Also included within the purview of the present invention are the acid addition salts of the novel medicinally valuable 1,4-benzodiazepines and benzodiazepin-2-ones of Formula I, I–A and I–B above. More particularly, the compounds of Formulae I, I–A and I–B above, form acid addition salts with pharmaceutically acceptable organic and inorganic acids, such as hydrochloric acid, hydrobromic acid, nitric acid, sulfuric acid, acetic acid, formic acid, succinic acid, maleic acid, p-toluene sulfonic acid, and the like.

DETAILED DESCRIPTION OF THE INVENTION

As used herein the term "lower alkyl" includes both straight and branched chain alkyl groups having from 1 to 7 carbon atoms, such as methyl, ethyl, propyl, isopropyl, and the like. The term "lower alkoxy" refers to both straight and branched chain alkoxy radicals containing from 1 to 7 carbon atoms, such as ethoxy, methoxy, butoxy, etc. The term "lower alkanoyloxy" refers to both straight chain and branched chain aliphatic carboxylic acid moieties containing from 2 to 7 carbon atoms such as acetoxy, propionyloxy, butryryloxy and the like. The term "halogen" includes bromine, chlorine, fluorine, and iodine. The term "alkyl amino" included monoalkyl amino radicals such as methylamino, ethylamino, and di-alkyl amino radicals such as di-methylamino, di-ethylamino, etc.

The preferred benzodiazepines and benzodiazepin-2-ones of Formula I above of this invention are those compounds wherein A is:

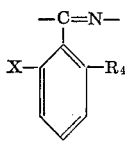

wherein X and $R_4$ are as above.

The preferred benzodiazepines of Formula I–A above are those compounds wherein A is:

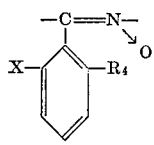

wherein X and $R_4$ are as above.

In the preferred embodiment of the benzodiazepines and benzodiazepin-2-ones of Formulae I and I–A above, R is a substituent in the 7 position and is either halogen, trifluoromethyl, or nitro. When R is a halogen in the 7 position, the preferred halogens are chlorine and bromine. When $R_1$ is a lower alkyl radical, the preferred radical is methyl. When $R_1$ is a lower alkanoyloxy radical, the preferred radical is acetoxy. In accordance with a preferred embodiment of this invention $R_3$ is preferably hydrogen. The symbolic grouping —$C_nH_{2n}$— represents straight or branched chain alkyl groups containing 2 or more carbon atoms between the nitrogen atoms joined thereby, such as ethylene, propylene, isopropylene, butylene and the like. In a preferred aspect of this invention, $n$ is either 2 or 3. When $R_4$ is halogen, the preferred halogen is either chlorine or fluorine. When $R_4$ is a lower alkoxy radical, the preferred radicals are methoxy and ethoxy. In compounds of Formula I–A, $R_5$ and $R_6$ are preferably hydrogen, lower alkyl radicals, such as methyl or ethyl, or heterocyclic radicals which form with their attached nitrogen above, a pyrrolidino or piperidino ring.

The benzodiazepines and benzodiazepin-2-ones of Formula I, I–A and I–B above, which have a 2,6-disubstituted phenyl group in the 5-position demonstrate a high degree of activity and are useful as sedatives, muscle relaxants, anticonvulsants, hypnotics, and psychosedatives. This is surprising in view of the fact that the corresponding position isomeric compounds having radicals substituted on the 2 and 4-position of the 5-phenyl ring demonstrate no useful activity. The compounds of Formulae I and I–A above, as well as their pharmaceutically acceptable acid addition salts are used in the form of conventional pharmaceutical preparations which contain said compounds in connection with conventional pharmaceutical organic or inorganic materials suitable for internal administration. The pharmaceutical compositions containing the compounds of Formulae I, I–A and I–B as well as their pharmaceutically acceptable acid additions salts, can be administered parenterally or orally. Dosages can be adjusted to individual requirements, for example, these compounds can be administered in dosages of from about 0.01 mg./kg. to about 10.0 mg./kg. per day. These dosages can be administered in a single dosage form or in divided dosage forms. The pharmaceutical compositions can contain conventional organic or inorganic inert carrier materials, such as water, gelatin, lactose, starch, magnesium sterate, talc, vegetable oils, gums, polyalkylene glycols, vaseline or the like. The pharmaceutical preparations can be in conventional solid dosage forms such as tablets, dragees, suppositories, capsules or in conventional liquid dosage forms such as solutions, suspensions or emulsions. The pharmaceutial compositions can be submitted to conventional pharmaceutical expedient such as sterilization and/or can contain pharmaceutical additives such as preservatives, stabilizing agents, wetting agents, emulsifying agents, salts for adjusting the osmotic pressure, buffers or the like. They also can contain other therapeutically useful materials.

The compounds of Formulae I, I–A and I–B are extremely effective and active as sedatives and muscle relaxants. This can be seen by the fact that dosages of from below 10 to 100 mg./kg. and above administered orally to cats produce muscle relaxation. For example, compounds such as 7-chloro-5-(2,6-difluorophenyl)-1-methyl-1,3-dihydro-2H-1,4-benzodiazepin-2-one; 5-(2,6 - difluorophenyl)-1, 3-dimethyl - 7 - nitro - 1,3 dihydro-2H-1,4-benzodiazepin-2-one and 7-chloro-5-(2,6-difluorophenyl)-1,3-dihydro-2H-1,4-benzodiazepin-2-one 4-oxide have minimum effective doses of 0.01 mg./kg., 0.1 mg./kg. and 0.5 mg./kg., respectively as measured by the unanesthesized cat test whereas the minimum effective dose of meprobamate, a conventional sedative and muscle relaxant, measured by the unanesthesized cat test is 50 mg./kg.

Furthermore, a compound such as 7-nitro-5-(2,5-difluorophenyl) - 1 - methyl - 1,3-dihydro-2H-1,4-benzodiazepin-2-one and a compound such as 5-(2,6-difluorophenyl)-1,3 - dihydro - 7 - nitro-2H-1,4-benzodiazepin-2-one have $PD_{50}$ of 0.50 mg./kg. p.o. and 0.25 mg./kg. p.o. respectively as measured by the inclined screen test in mice (Behren, Arch. Expt. Path and Pharm. 140:237, 1929) whereas a common muscle relaxant and sedative such as meprobamate has $PD_{50}$ of 256 mg./kg. p.o. as measured by the same test.

The uanesthesized cat test utilized to determine the sedative and muscle relaxant activity of a compound is performed by treating cats orally with the compound to be tested and observing the minimum dose of the compound necessary to produce ataxia.

The compounds of Formulae I and I–A are extremely effective as anticonvulsants and sedatives. This can be seen by the fact that when dosages of 10 mg./kg. as above, of the compounds of Formulae I and I–A are administered orally to mice, the mice are protected from convulsions and death caused by administration of metrazol by the method set forth in Proc. Soc. Exp. Med. and Bio. 57,261, 1944. For example, using this method, the E.D. 50 found for 7 - chloro-1-methyl-5-(2,6-difluorophenyl) - 1,3,4,5 - tetrahydro - 2H-1,4-benzodiazepin-2- one; for 7 - chloro - 1,3-dihydro-5-(2,6-difluorophenyl)-2H-1,4-benzodiazepin-2-one; for 7 - chloro - 5-(2,6-difluorouphenyl) - 1,3 - dihydro-3-hydroxy-2H-1,4-benzodiazepin-2-one and for 7-chloro-5-(difluorophenyl)-2-methylamino-3H-1,4-benzodiazepin 4-oxide are 6.0 mg./kg., 0.47 mg./kg., and 3.32 mg./kg. respectively whereas phenobarbital, a common anticonvulsant and sedative has an ED. 50 of 70 mg./kg.

The compounds of Formulae I and I–A above are prepared from a 2-amino-2′,6′-dihalobenzophenone of the formula:

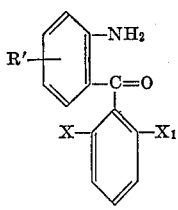

wherein R′ is selected from the group consisting of trifluoromethyl, hydrogen and halogen, and X and $X_1$, are halogens.

The benzophenones of Formulae II above are formed from a meta dihalo substituted phenyl compound of the formula:

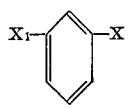

III wherein $X_1$ and X are as above.

The compound of Formula III can be converted to the compound of Formula II by any one of two methods outlined in the following reaction scheme:

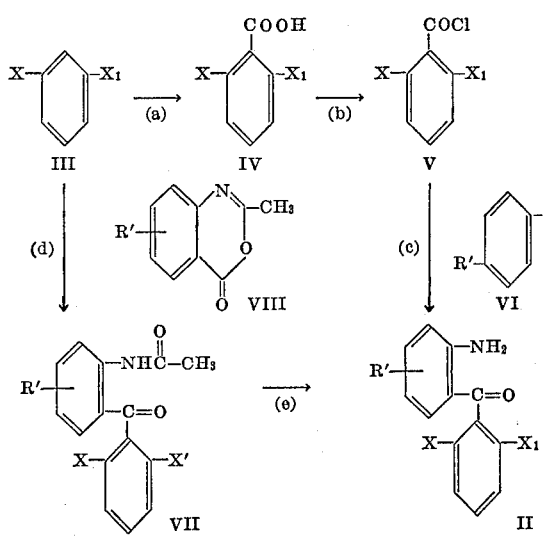

wherein R′, X and $X_1$ are as above.

The compound of Formula III is converted into the dihalo benzoic acid compound of Formula IV, as in reaction step (a), by treating an organo metallic salt of the compound of Formula III above, with carbon dioxide. Typical organo metallic salts which can be utilized in accordance with this invention include lithium metadifluorobenzene, lithium metadichlorobenzene, sodium metadichlorobenzene, etc. The reaction of step (a) is carried out by treating the compound of Formula III in the form of an organo metallic salt with carbon dioxide. The carbon dioxide can be bubbled into the reaction medium or can be added in the form of Dry Ice. In carrying out this reaction, temperature and pressure are not critical and the reaction can be carried out at room temperature or higher. Generally it is best to carry out this reaction at lower temperatures, preferably at a temperature as low as −70° C. This reaction is preferably carried out in the presence of an inert organic solvent. Any conventional inert organic solvent can be utilized. Among the preferred solvents for use in this reaction are ethers such as tetrahydrofuran, diethyl ether and the like.

The dihalo benzoic acid compounds of Formula IV above, are converted into the acid chloride compounds of Formula V above, by means of treating this dihalo benzoic acid compound with a conventional acid chlorinating agent such as thionyl chloride. The reaction of step (b) is carried out by utilizing conventional and well-known techniques.

The compound of Formula V above, is converted into the benzophenone compound of Formula II above, where R′ in Formula II above, is in the 5-position by means of reacting the compound of Formula V with the para substituted aniline derivative of Formula VI above, under Friedel Crafts Conditions. In carrying out this reaction, a catalyst such as zinc chloride is utilized. This reaction is carried out by utilizing temperatures of from about 180° C. to 220° C. without any solvent being present. The resulting product is then subjected to hydrolysis in an aqueous acid solution to give the compound of Formula II above, wherein R′ is in the 5-position. Any of the conventional conditions utilized in acid hydrolysis can be used in carrying out this portion of the reaction.

Another means of preparing the benzophenone compounds of Formula II above, from the organo metallic salts of the compounds of Formula III above, is by first reacting the organo metallic salts of the compounds of Formula III above, with a 2-methyl-3,1-benzoxazin-4-one compound of Formula VIII above, to form the benzoylacetanilide compound of Formula VII above. The compound of Formula VIII above, can be unsubstituted or substituted with a halo group or a trifluoromethyl group in any position. Any of the organo metallic compounds of Formula III above, which were used in step (a) can be utilized in the reaction of step (d). In carrying out the reaction of step (d), the same conditions that were utilized in connection with step (a) can be utilized.

The benzoylacetanilide compound of Formula VII above is converted to the benzophenone of Formula II above, as in step (e) by treating the compound of Formula VII above with a hydrolyzing agent such as a mineral acid. Any conventional acid hydrolyzing agent and acid hydrolyzing conditions can be utilized in carrying out the reaction of step (e). In this manner a compound of Formula II above, is produced wherein R′ is substituted on either the 3, 4, 5 or 6-position.

The 2-amino-2′,6′-dihalobenzophenone compound of Formula II can, if desired, be converted into the corresponding mono-halo compound with one of its halogen groups replaced by an alkoxy radical, an alkyl amino radical, an alkyl thio radical, or a hydroxy radical so that a compound can be produced having the formula:

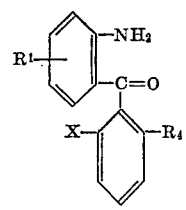

IX wherein R′, X, and $R_4$ are as above.

The conversion of compound of the Formula II above, into a compound of the formula:

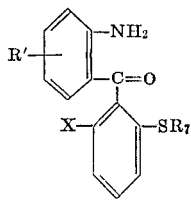

IXA wherein X and R' are as above and $R_7$ is a lower alkyl, is carried out by reacting compounds of the Formula II above, with an alkali metal lower alkyl mercaptan. Generally it is preferred to carry out this reaction in the presence of an inert organic solvent. Any conventional organic solvent can be utilized in carrying out this reaction. Typical inert organic solvents which can be utilized include methylcellosolve, ethanol, methanol, dichloromethane, hexane, benzene, etc. In carrying out this reaction, any alkali metal lower alkyl mercaptan can be utilized to replace the halo group on the 2'-position of the benzophenone compound of Formula II above, with an alkyl thio group. Among the preferred alkali metal lower alkyl mercaptans are included sodium methyl mercaptan, sodium ethyl mercaptan, potassium-isopropyl mercaptan, lithium methyl mercaptan, etc. In carrying out this reaction, temperature and pressure are not critical and this reaction can be carried out at room temperature and at atmospheric pressure or at elevated temperatures and pressures. Generally, it is preferred to carry out this reaction at elevated temperatures such as the reflux temperature of the solvent which can be from 90° C. to 140° C., depending upon the solvent.

The conversion of a compound of the Formula II above into a compound of the formula:

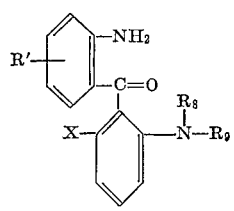

IX—B wherein R' and X are as above, and $R_8$ and $R_9$ are lower alkyl groups,
is carried out by reacting componds of the Formula II above with a lower alkyl amine, such as a monoalkyl amine or a dialkyl amine. Among the preferred lower alkyl amines which can be utilized in accordance with this invention are included N-methyl-N-ethyl amine, dimethyl-amine, N-propyl-N-ethyl-amine, methyl-amine, ethyl-amine, diethyl-amine, etc. Generally it is preferred to carry out this reaction in the presence of any conventional inert organic solvent. Typical organic solvents which can be utilized include any of the aforementioned organic solvents. Among the preferred organic solvents are included ethanol, propanol, methanol, diethyl ether, etc. In carrying out this reaction, temperature and pressure are not critical and this reaction can be carried out at room temperature and atmospheric pressure or at elevated temperatures and pressures. Generally, it is preferred to carry out this reaction at elevated temperatures which can be from about 90° C. to 140° C. and at pressures of from about 1 to 10 atmospheres. By means of this reaction, the halo group on the 2'-position of the aminobenzophenone compound of Formula II above is replaced with an alkyl amino group.

The conversion of the compound of Formula II above into a compound of the formula:

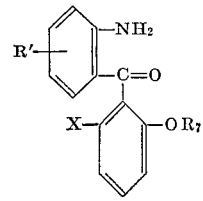

IX–C wherein R' and X are as above, and $R_7$ is lower alkyl, is carried out by reacting compounds of the Formula II above with an alkali metal lower alkoxide. In carrying out this reaction, any conventional alkali metal lower alkoxide can be utilized to selectively replace the halo group on the 2'-position of the aminobenzophenone compound of Formula II above. Among the preferred alkali metal alkoxides are included sodium methoxide, sodium ethoxide, potassium ethoxide, and lithium propoxide. Generally, it is preferred to carry out this reaction in an inert organic solvent. Any conventional inert organic solvent such as the solvents hereinbefore mentioned can be utilized in carrying out this reaction. Among the preferred solvents which can be utilized in this reaction are included methanol, ethanol, diethyl ether, etc. In carrying out this reaction, temperature and pressure are not critical and this reaction can be carried out at room temperature and at atmospheric pressure or at elevated temperatures and pressures. Generally, it is preferred to carry out this reaction at elevated temperatures such as the reflux temperature of the solvent, which can be from about 90° C. to 140° C. depending upon the solvent.

The compound of Formula IX–C, above, can if desired, be converted into a compound of the formula:

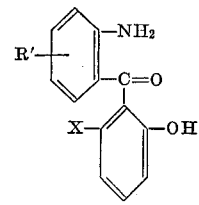

IX—D by reacting the compound of the Formula IX–C above, with an inorganic acid such as hydrobromic acid or hydroiodic acid in an aqueous medium. The concentration of the acid utilized in this reaction is from about 20 percent to 50 percent by weight of the aqueous medium. In carrying out this reaction, the reaction medium is heated to its reflux temperature.

If R', in compounds of the Formula IX is a halo radical, the compound has the formula:

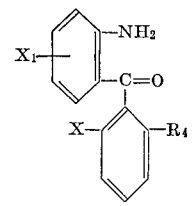

IX—E wherein X, $X_1$, and $R_4$ are as above.

In accordance with this invention, the 5-halo radical can be easily removed therefrom by hydrogenating the compound of Formula IX–E above. The hydrogenation is carried out by treating the compound of Formula IX–E with hydrogen gas in the presence of a palladium hydrogenation catalyst such as palladium on carbon. In carrying out this hydrogenation reaction, temperature and pressure are not critical and the reaction can be carried out at room temperature or at elevated pressures and temperatures.

The compounds of Formula IX above, can be converted into compounds of the formula:

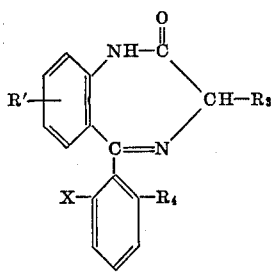

X wherein R', $R_3$, $R_4$, and X are as above, by reacting the compound of Formula IX with an α-halo-lower alkanoyl halide to form compounds of the formula:

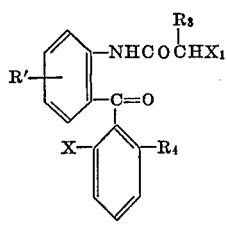

XI wherein R', $R_3$, $R_4$, X and $X_1$ are as above.

The compounds of Formula XI are then reacted with ammonia in alcoholic solution to yield a compound of the formula:

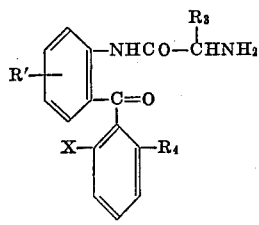

XI–A wherein R', $R_3$, $R_4$, and X are as above.

The compounds of Formula XI–A are useful as hypnotics psychosedatives, sedatives, anticonvulsants and muscle relaxants. These compounds of Formula XI–A can be used in the same manner and dosage levels as hereinbefore described for the compounds of Formulae I and IA.

The compound of Formula XI–A can be cyclized to form compounds corresponding to Formula X above. For example, the compound of Formula XI–A can be dissolved in an inert organic solvent such as in any of the solvents hereinbefore mentioned and then heated under reflux, i.e. from 60° C. to 120° C. depending upon the solvent, until cyclization is effected.

The compounds of Formula X above, can also be prepared directly from the compounds of Formula IX above, via reaction with an α-amino acid. In these compounds of Formula X wherein $R_3$ is hydrogen, the α-amino acid utilized is glycine. The reaction, i.e., of the compound of Formula IX above with an α-amino acid, is carried out with an α-amino acid ester hydrochloride, for example, a lower alkyl eser of an α-amino acid. Thus, where $R_3$ in compounds of Formula X above is hydrogen, the compound of Formula IX above, can be reacted either with glycine or glycine ethyl ester hydrochloride to obtain a compound corresponding to Formula X above. Where $R_3$ in compounds of Formula X above is a lower alkyl, then α-amino acids having the formula:

$$R_3\text{—CH(NH}_2\text{)COOH}$$

and esters of such acids, are used to introduce the alkyl group into the final compounds. Typical α-amino acids used in this process, wherein $R_3$ is a lower alkyl, are for example, alanine, valine, and the like. The above reactions, both where $R_3$ is a hydrogen and is a lower alkyl, are preferably affected in a solvent such as pyridine, dimethyl formamide, and the like. It is also preferable to utilize one of the materials, or a fraction thereof, present in the form of the salt of a strong organic or inorganic acid, such as glycine hydrochloride, glycine ethyl ester hydrochloride, and pyridine hydrochloride. In carrying out this reaction, temperature and pressure are not critical and the reaction can be carried out at room temperature and atmospheric pressure and at elevated temperatures and pressures.

If desired, when in Formula X above, R' is hydrogen, this compound can be converted to the corresponding nitro compound by treating the last mentioned compound with an alkali metal nitrate or nitric acid in the presence of a mineral acid such as sulfuric acid. Typical alkali metal nitrates which can be utilized include sodium nitrate, potassium nitrate, etc. The inorganic acid in carrying out this reaction is preferably utilized as the reaction media. In carrying out this reaction, temperature and pressure are not critical and this reaction can be carried out at room temperature or at elevated or reduced temperatures. Generally, it is preferred to carry out this reaction at a temperature of from about −10° C. to about 40° C. In this manner, compounds of the formula:

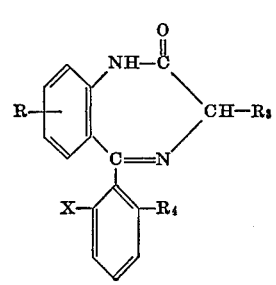

X–A wherein R, $R_3$, $R_4$, and X are as above, can be prepared from compounds of the Formula IX.

The benzodiazepine compound of Formula X can be converted to the various compounds by means of the following reaction scheme:

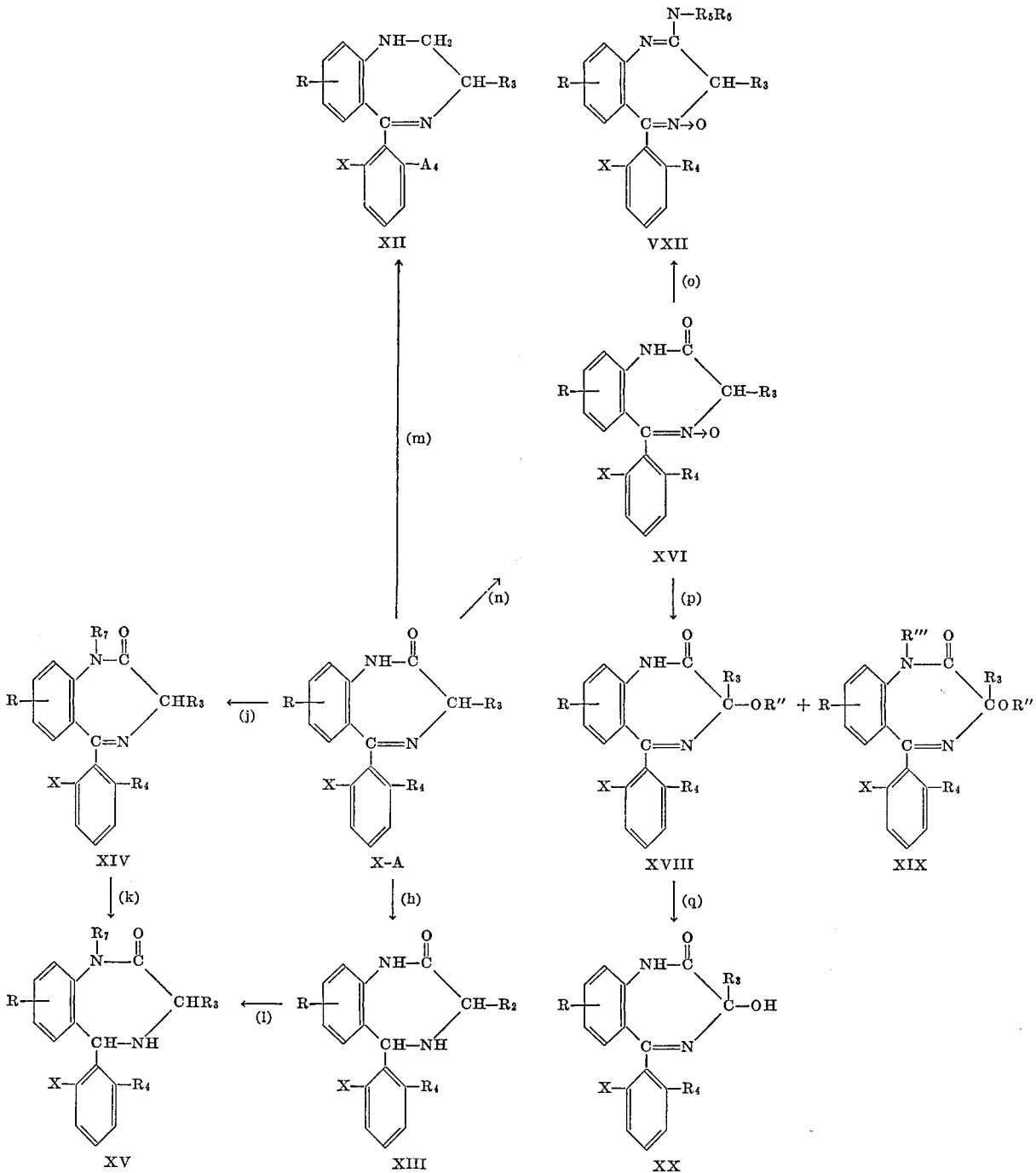

wherein in the above reaction scheme, R, $R_1$, $R_3$, $R_4$, $R_5$, $R_6$, $R_7$, and X are as above, and
R" is lower alkanoyl and R'" is lower alkanyloxy.

In accordance with this invention, compounds of the formula X–A can be converted to compounds of the Formula XIV above, as in reaction (j), by means of treating the compounds of Formula X–A above, with a suitable alkylating agent, preferably after first affecting the conversion thereof to the 1-sodio derivative, with, for example, a sodium alkoxide, e.g., sodium methoxide, or an alkali metal hydride, such as sodium hydride. In this manner, an alkyl group can be placed on the 1-position of the benzodiazepin-2-one ring. Any conventional alkylating agent and alkylating conditions can be utilized in carrying out this reaction. Representative of alkylating agents suitable for the purpose of the present invention may be included a lower-alkyl halide, such as methyl iodide, ethyl chloride, etc. or a dilower alkyl sulfate, such as dimethyl sulfate, diethyl sulfate, etc.

Compounds of Formula XIV above, can be converted to the compound of Formula XV above, as in reaction step (k), by means of hydrogenating the compound of Formula XIV above. In this manner, the dihydro-benzodiazepin-2-one of Formula XIV is converted into the tetrahydro-benzodiazepin - 2-one of Formula XV. When R is either hydrogen, halogen or trifluoromethyl in compounds of the Formula XIV above, any conventional means of hydrogenating can be utilized to convert the compound of Formula XIV above into the compound of Formula XV above. Typical methods of hydrogenating, which can be utilized in accordance with this invention, include treating the compound of Formula XIV with hydrogen gas in the presence of a hydrogenation catalyst such as platinum. Generally, this reaction is carried out in a solvent which is preferably an organic acid such as acetic acid.

On the other hand, when R in compounds of the Formula XIV above is a nitro radical, the compound of Formula XIV above is chemically reduced to the compound of Formula XV above. This is carried out by treating the compound of Formula XIV above with a reducing agent such as dimethyl amino borane in an organic lower aliphatic acid solvent such as glacial acetic acid. In carrying out this reduction reaction, temperature and pressure are not critical. Generally it is preferred to use room temperature in carrying out this reaction.

The dihydrobenzodiazepin - 2-one compounds of Formula X–A above, can be directly converted into the tetrahydro-benzodiazepin-2-one compound of Formula XIII as in step (h), by means of hydrogenating the compound of Formula X–A above. This hydrogenation can be carried out in the same manner as recited in step (k). The conversion of the compounds of Formula XIII above, into the compounds of Formula XV above, can be carried out, as in step (1) by treating the compound of Formula XIII above with an alkylating agent. This alkylating reaction can be carried out in the same manner as described in connection with step (j).

Compounds of the Formula X–A above, are converted into compounds of the Formula XII above, as in step (m), by reducing the compound of the Formula XII above, with lithium aluminum hydride in the presence of a conventional organic solvent, such as tetrahydrofuran. The dihydro compound of Formula X–A above, can be converted into the corresponding tetrahydro compound by hydrogenation in the same manner as described in step (k). Furthermore, compounds of Formula XII above, can be alkylated in the 1-position by treatment with an alkylating agent, as described with respect to step (j).

Compounds of the Formula X–A above, can be converted into compounds of the Formula XVI above, as in step (n), by means of oxidizing the compound of the Formula X–A above with an organic peracid. A conventional organic peracid, such as peracetic acid, perpropionic acid, etc. can be utilized in carrying out this reaction. The oxidation can be effected at room temperature, or above or below room temperature. Also, in this manner, compounds of the Formula XIV above, can be oxidized to their corresponding N-oxides.

Compounds of Formula XII can, if desired, be converted to the corresponding 4-N-oxides via oxidation as in step (n). In order to provide for facile oxidation of the 4-position nitrogen atom it is necessary to first protect the 1-position nitrogen atom with an acyl protecting group, for example, a lower alkanoyl e.g. formyl or acetyl radical prior to oxidation as in step (n). The acyl protecting group can be removed from this nitrogen atom after oxidation to the N-oxide is completed, if desired, to form compounds of Formula I above, wherein $R_1$ is hydrogen by hydrolysis. This hydrolysis is suitably effected in the presence of a molar equivalent of alkali, advantageously at room temperature. However temperatures up to 30° C. can be utilized.

The compounds of Formula XVI above, can be converted into the compounds of Formula XVII above, as in step (o), by treating the compounds of Formula XVI above, with an amino compound selected from the group consisting of ammonia, primary lower alkyl amines, and heterocyclic amino compounds, such as pyrrolidine and piperidine, and secondary lower alkyl amines, in the presence of a Lewis acid catalyst. In carrying out this reaction, any conventional acid catalyst can be utilized. A typical catalyst which may be utilized in carrying out this reaction is titanium tetrachloride. Among the preferred amino compounds which can be utilized in accordance with this invention are included, methylamine, diethylamine, N,N-methylethylamine, pyrrolidine and piperidine. The conversion of compounds of the Formula XVI into compounds of the Formula XVII is carried out in the presence of an inert organic solvent. Any conventional inert organic solvents can be utilized in carrying out this reaction. Typical inert organic solvents which can be utilized in accordance with this invention include diethyl ether, tetrahydrofuran, benzene, hexane, pentane, etc. In carrying out this reaction, temperature and pressure are not critical and this reaction can be effected at room temperature or below, and at atmospheric pressure or at elevated temperatures and/or elevated pressures.

Compounds of Formula XVII above, can if desired, be converted into compounds of the formula:

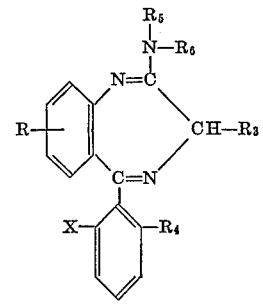

XVII–A wherein R, $R_3$, $R_4$, $R_5$, $R_6$, and X are as above, by treating the compounds XVII with phosphorus trichloride in an inert organic solvent media. Any conventional inert organic solvent can be utilized to carry out this conversion. Among the preferred solvents which can be utilized are included chloroform or benzene. In carrying out this reaction, it is preferred to utilize elevated temperature, preferably the reflux temperature of the solvent. The compound of Formula XVII–A above, can be hydrogenated to reduce the double bond in the 4- and 5-positions to a single bond. This is carried out by treating the compound of Formula XVII–A, above with hydrogen gas in the presence of Raney nickel catalyst. This reaction is carried out in an organic alcohol solvent medium such as, methanol, ethanol, etc. This reaction can be carried out at room temperature. However, temperatures above and below room temperature can be utilized.

The conversion of compounds of the Formula XVI above, into compounds of the Formulae XVIII and XIX above, is carried out as in step (q), by treating the compound of the Formula XVI above, with an anhydride of a lower alkanoic acid such as acetic acid, propionic acid, etc. Furthermore, this reaction is carried out utilizing the lower alkanoic acid anhydride as the solvent medium. In carrying out this reaction, temperature and pressure are not critical and the reaction of step (q) can be carried out at room temperature and atmospheric pressure or at elevated temperatures and pressures. Generally, it is preferred to carry out this reaction at temperatures of from about 40° C. to 120° C.

Compounds of the Formulas XVIII and XIX, which are formed as a result of step (q), are separated by means of the fact that compounds of the Formula XVIII above, precipitate from the solvent medium, while compounds of the Formula XIX above, are soluble in the lower alkanoic acid anhydride solvent medium.

Compounds of Formula XVIII above, can be converted to the compound of Formula XX by any conventional hydrolysis procedure such as by treating the compounds of Formula XVIII above, with an alkali metal hydroxide e.g. sodium hydroxide or an alkaline earth metal hydroxide or a mineral acid.

The N-oxide compound of Formula XVII above, can be converted into the corresponding "4-desoxy" compound, wherein the hydrogen in position 3 is replaced by a lower alkanoyloxy group by means of treating the compound of Formula XVII above, in the manner of step (p). This resultant compound can, if desired, be converted into the corresponding compound wherein the lower alkanoyloxy compound is replaced by a hydroxy group by means of treatment with a hydrolyzing agent as described with respect to step (q).

The corresponding N-oxide of Formula XII above, can be converted into a compound of Formula XII wherein the hydrogen in position 3 is replaced by a lower alkanoyloxy group by means of treating the N-oxide in the manner of step (p). This compound can be, if desired, converted into the corresponding compound wherein the lower alkanoyloxy group is replaced by a hydroxy group by treatment in the manner of step (q).

Compounds of the Formulae XVI above, XVIII above, and XX above, can be alkylated in the 1-position by treating these compounds with an alkylating agent in the manner of step (j). Furthermore, the corresponding tetrahydro compounds of Formulae XVIII above, XIX above, and XX above, can be produced by hydrogenating these compounds in the manner of step (k).

Compounds of the formula:

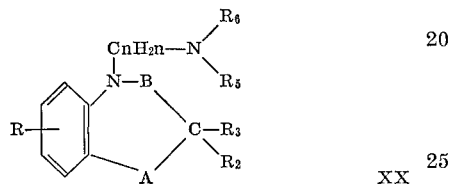

XX wherein A, B, $n$, $R_2$, $R_3$, $R_5$ and $R_6$ are as above, can be prepared from their corresponding benzodiazepines and benzoidazepin-2-ones of Formula I above, wherein R is hydrogen by reaction of these compounds, preferably after first effecting the conversion of the 1-unsubstituted cmopounds of Formula I above, to their 1-sodio derivatives, with an amino lower alkyl halide of the formula:

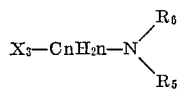

wherein $n$, $R_5$ and $R_6$ are as above, and $X_3$ is a halogen atom selected from the group consisting of chlorine, bromine and iodine.

This reaction is carried out in the manner described in U.S. Pat. No. 3,299,053, Jan. 17, 1967, Archer et al.

Another means of preparing the compound of Formula XXI above, from the compound of corresponding benzodiazepines and benzodiazepin-2-ones of Formula I, wherein $R_1$ is hydrogen is by first reacting the compounds of Formula I, preferably after first effecting their conversion of the 1-unsubstituted compounds of Formula I above, to their 1-sodio derivatives with a compound of the formula:

$$X_3—CnH_2n—X_4$$

wherein $n$ and $X_3$ are as above and $X_4$ is selected from the group consisting of chlorine, bromine and iodine.

This reaction product is converted to the compound of Formula XXI above, by reacting this reaction product with an amino compound of the formula:

wherein $R_6$ and $R_5$ are as above.

Among the preferred amino compounds which are utilized in accordance with this invention are included, diethylamine, N-methylamine, pyrrolidine and piperidine. These reactions, to produce a compound of Formula XXI above, are carried out in the manner described in U.S. Pat. No. 3,299,053, Jan. 17, 1967.

Compounds of the Formula I–B can be prepared from the tetrahydro compounds of the Formulae XIII and XV above, by treating the compounds of the Formulae XIII and XV above with an alkyl halide in the manner described in U.S. Pat. No. 3,136,815, June 9, 1964, Reeder et al.

Another means whereby benzodiazepines and benzodiazepin-2-ones of this invention can be prepared is by the following reaction scheme:

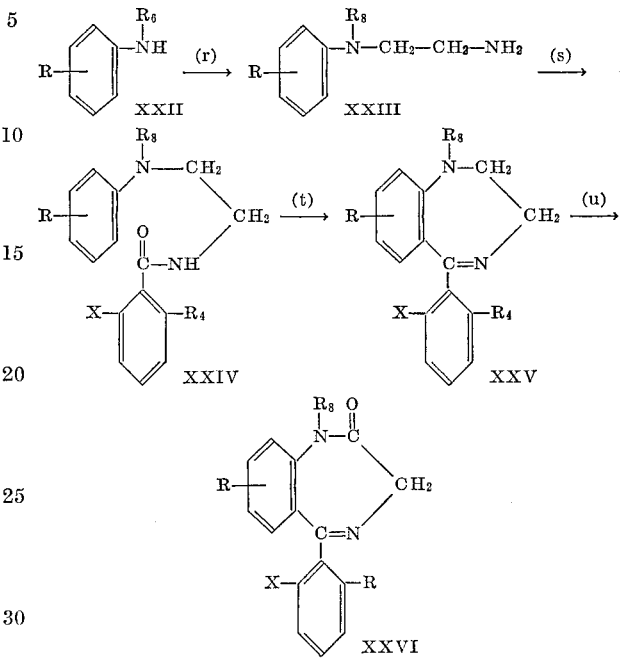

wherein X, R, and $R_4$ are as above, and $R_8$ is lower alkyl.

The N-substituted-aniline of the Formula XXII is converted to the compound of Formula XXIII by treating the compound of Formula XXII with ethyleneimine in the presence of an aprotic Lewis acid, such as, for example, boron trifluoride, titanium tetrachloride, aluminum chloride, and the like (preferentially aluminum chloride), with an inert organic solvent. Among the typical inorganic solvents which can be utilized in step (r), are included benzene, toluene and the like. While temperature is not a critical aspect of this reaction, elevated temperatures are preferred. Generally, it is preferred to utilize the reflux temperature of the reaction medium.

Compounds of the Formula XXIII are converted into compounds of the Formula XXIV by treating compounds of the Formula XXIII with a benzoyl halide of the formula:

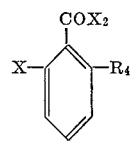

wherein X and $R_4$ are as above and $X_2$ is a halogen.

$X_2$ can be any suitable halo group. In the most advantageous aspects, $X_2$ is selected from the group consisting of chlorine or bromine. The reaction of step (s) can, if desired, be carried out in the presence of an acid acceptor. If an acid acceptor is utilized, an excess of acid acceptor can be provided whereby it can also serve as the medium in which the reaction is effected. Any suitable acid acceptor which will function efficaciously for the purposes of the present invention is contemplated. Especially preferred are tertiary amines e.g. pyridine and the like. On the other hand, this reaction can be preferably carried out in an inert organic solvent without having an acid acceptor present. Representatives of organic solvents usable in this preferred process include, aromatic hydrocarbons such as benzene, toluene and the like, halogenated aromatic hydrocarbons such as chlorobenzene or the like, and any other suitable inert organic solvent. In carrying out this reaction, temperature and pressure are not critical and this reaction can be carried out at room temperature and atmospheric pressure or at elevated temperatures and pressures.

In step (t), the compound of Formula XXIV above, is cyclized to the compounds of Formula XXV above. This cyclization can be effected with any conventional dehydrating agent. Among the many dehydrating agents suitable for the purpose of the present invention may be included phosphorous pentoxide, phosphorus oxychloride, polyphosphoric acid, and the like, and mixtures thereof. In a particular advantageous process variation of the present invention, a dehydrating system comprising essentially phosphorus oxy-chloride and phosphorus pentoxide are employed preferably containing the former in a molar amount greater than 50 percent of the total molar amount of these two ingredients. Generally it is preferred to carry out the dehydration reaction at a temperature range of from 50° C. to about 120° C.

If desired, the benzodiazepines of Formula XXV can be converted to the benzodiazepin-2-ones of Formula XXVI above, by means of oxidation. In effecting this reaction, any conventional oxidizing agent can be utilized. Preferred oxidizing agents are those formed from chromium and manganese in combination with oxygen at their higher valences, for example, chromic acid or the permanganate ion. In carrying out this reaction, temperature and pressure are not critical and this reaction can be carried out at room temperature and atmospheric pressure. On the other hand, elevated temperatures such as the reflux temperature of the reaction medium can be utilized.

The following examples are illustrative but not limitative of the invention. In the examples, temperatures are stated in degrees centigrade, and unless otherwise specified, the ether utilized was diethyl ether.

In the foregoing examples where two solvents were utilized for crystallization or recrystallization, the first organic solvent was added in an amount just sufficient to dissolve the material and the second organic solvent was added in an amount just sufficient to form a cloudy mixture. After both solvents were added, the entire mixture was cooled so as to initiate crystallization.

EXAMPLE 1

4'-chloro-2'-(2,6-difluorobenzoyl)acetanilide

A solution of 114 g. (1 mole) of m-difluorobenzene in 130 ml. of dry tetrahydrofuran was added dropwise to a commercial solution of 1 mole of N-butyl lithium in hexane, at −70°. The solution was stirred at this temperature for 45 minutes and then added to a solution of 185 g. (0.944 mole) of 6-chloro-2-methyl-3,1-benzoxazin-4-one in 1.5 liters of dry tetrahydrofuran also at −70°. The reaction mixture was stirred at this temperature for 1 hour and then 3 N hydrochloric acid was added until pH 5 was reached. The reaction mixture was then evaporated to dryness, 1 liter of water was added and the mixture was extracted with dichloromethane (3× 250 ml.). The organic layers were combined, washed with water, dried over sodium sulfate, filtered, and evaporated. The residue was crystallized from dichloromethane to give 4'-chloro-2'-(2,6-difluorobenzoyl)acetanilide.

EXAMPLE 2

2-amino-5-chloro-2',6'-difluorobenzophenone

Method 1.—A solution of 128 g. (0.41 mole) of 4'-chloro-2'-(2,6-difluorobenzoyl)acetanilide in a mixture of 150 ml. of ethanol and 350 ml. of concentrated hydrochloric acid was heated under reflux for 4 hrs. Ethanol was removed under reduced pressure and 2-amino-5-chloro-2',6'-difluorobenzophenone was obtained by filtration. The precipitate was dissolved in dichloromethane which was washed with dilute ammonium hydroxide, water, brine, dried over sodium sulfate and evaporated. The product was recrystallized from a mixture of dichloromethane/hexane to give 2-amino-5-chloro-2',6'-difluorobenzophenone as yellow prisms.

Method 2.—A solution of 52 g. (0.33 mole) of 2,6-difluorobenzoic acid prepared in the manner disclosed by C. Tamborski and E. J. Soloski, J. Org. Chem., 31, 746 (1966), in 250 ml. of thionyl chloride was heated under reflux for 2 hrs. excess thionyl chloride was removed by distillation and 125 ml. of benzene was added. Removal of benzene under reduced pressure gave 59 g. of the crude acid chloride. The acid chloride, prepared as above, was heated to 120° when 20.5 g. (0.15 mole) of para-chloroaniline was added with stirring. The temperature was raised to 180° and 29 g. of anhydrous zinc chloride was added. The temperature was raised to 210° and maintained there for 2 hrs. when 250 ml. of 3 N hydrochloric acid was cautiously added. The mixture was brought to the boil and the solution was decanted. This process was repeated twice more and then the residue was hydrolyzed by heating for 18 hrs. under reflux in a mixture of 175 ml. of water, 325 ml. of concentrated sulfuric acid and 250 ml. of glacial acetic acid. The solution was adjusted to pH 8 with sodium hydroxide, cooled and extracted with dichloromethane (3× 250 ml.). The organic layers were combined, washed with water (3× 200 ml.), 3 N hydrochloric acid (3× 200 ml.), water (3× 200 ml.), dried over anhydrous sodium sulfate and filtered over 400 g. of Woelm Grade 1 neutral alumina. A 1:1 by volume mixture of ether/ethyl acetate was used as the eluant. Removal of the solvent and recrystallization of the residue from a mixture of dichloromethane/hexane gave 2-amino-5-chloro-2',6'-difluorobenzophenone.

EXAMPLE 3

2-amino-5-chloro-2'-fluoro-6'-methylthiobenzophenone

A mixture of 80 ml. of a 1 molar solution of sodium methylmercaptan in methyl Cellosolve and 10 g. (0.037 mole) of 2-amino-5-chloro-2',6'-difluorobenzophenone was heated under reflux for 5 hrs. Solvents were removed under reduced pressure and the residue was dissolved in dichloromethane, washed with water, dried over anhydrous sodium sulfate and evaporated. The residue was treated with four 250 ml.-portions of boiling hexane and was decanted. The hexane extracts were combined and evaporated to give the crude product as an oil. The oil was dissolved in benzene and chromatographed over 250 g. of silica. Removal of the solvent from the benzene fraction gave 2-amino-5-chloro-2'-fluoro-6'-methylthiobenzophenone which was recrystallized from the mixture of ether/pet. ether (B.P. 30–60°).

EXAMPLE 4

2-amino-5-chloro-2'-dimethylamino-6'-fluorobenzophenone

A solution of 20 g. of dimethylamine in 250 ml. of ethanol was treated with 15 g. of 2-amino-5-chloro-2',6'-difluorobenzophenone was placed in an autoclave. The autoclave was charged with an over pressure of 7 atmospheres of nitrogen, and heated at 110° for 15 hrs. Solvents were then removed and the residue was dissolved in ether. Impurities were removed by filtration and the product was extracted into 3 N hydrochloric acid, (3× 100 ml.). The acid layers were combined, made basic with dilute ammonium hydroxide and extracted with dichloromethane (3× 200 ml.). The organic layers were combined, washed wtih water, dried over sodium sulfate and filtered over a small amount of silica. The silica was eluted with ethyl acetate and the solvents were removed to give the crude product, which was crystallized from ether and then from a mixture of ether/pet. ether (B.P. 30–60°) to give 2-amino-5-chloro-2'-dimethylamino-6'-fluorobenzophenone as yellow prisms.

EXAMPLE 5

2-amino-5-chloro-2'-fluoro-6'-methoxybenzophenone

A solution of 15 g. (0.0559 mole) of 2-amino-5-chloro-2',6'-difluorobenzophenone in 100 ml. of benzene was treated with 85 ml. of a 2.17 molar solution of sodium methoxide in methanol. The solution was heated to reflux for 24 hrs., cooled, washed with water, dried over anhydrous sodium sulfate and evaporated to dryness. The residue was dissolved in benzene and filtered over a small amount of alumina, to give after removal of the solvent 2 - amino-5-chloro-2'-fluoro - 6' - methoxybenzophenone. Recrystallization from a mixture of dichloromethane/hexane gave the product as yellow prisms.

EXAMPLE 6

2-amino-2',6'-difluorobenzophenone

A mixture of 4 g. of 2-amino-5-chloro-2',6'-difluorobenzophenone, 0.6 g. of charcoal, 2.5 g. of potassium acetate, 0.2 ml. of a 20 percent solution of palladium chloride, 0.2 g. of 10 percent palladium on charcoal and 70 ml. of tetrahydrofuran was hydrogenated at room temperature and atmospheric pressure until hydrogen uptake had ceased. The reaction mixture was filtered over Celite and the filtrate was evaporated to dryness. Recrystallization of the residue from ether/pet. ether (B.P. 30–60°) gave the 2-amino-2',6'-difluorobenzophenone as yellow rods.

EXAMPLE 7

2-bromo-4'-chloro-2'-(2,6-difluorobenzoyl)acetanilide

A solution of 3.54 g. (0.0175 mole) of bromoacetyl bromide in 100 ml. of benzene was added dropwise to a solution of 4.9 g. (0.0146 mole) of 2-amino-5-chloro-2',6'-difluorobenzophenone in 75 ml. of benzene. The mixture was heated under reflux for 1 hr., cooled, and filtered. The precipitate was washed with petrol and dried to give the 2-bromo-4'-chloro-2'-(2,6-difluorobenzoyl)acetanilide. A recrystallization from a mixture of benzene/hexane gave this product as white rods.

EXAMPLE 8

2-bromo-4'-chloro-2'-(2-fluoro-6-methylthiobenzoyl)acetanilide

A solution of 15 g. (0.075 mole) of bromoacetyl bromide in 10 ml. of benzene was added dropwise to a solution of 15 g. (0.05 mole) of 2-amino-5-chloro-2'-fluoro-6'-methylthiobenzophenone in 125 ml. of benzene. The solution was heated under reflux for 3.5 hrs., and the solvents were removed under reduced pressure. The residue was dissolved in dichloromethane and filtered over Florisil to give after removal of solvents, 2-bromo-4'-chloro-2'-(2 - fluoro - 6 - methylthiobenzoyl)acetanilide. Crystallization and recrystallization of a portion of this material from methanol gave this product as yellow prisms.

EXAMPLE 9

2-bromo-4'-chloro-2'-(2-dimethylamino-6-fluorobenzoyl)acetanilide

A solution of 13.18 g. (0.0652 mole) of bromoacetyl bromide in 25 ml. of benzene was added dropwise to a solution of 12.75 g. (0.0435 mole) of 2-amino-5-chloro-2'-dimethylamino-6'-fluorobenzophenone in 100 ml. of benzene. The mixture was heated under reflux for 4 hrs., cooled, and filtered. The precipitate was suspended in dichloromethane and washed with dilute potassium carbonate solution. The solution of the free base now soluble in dichloromethane was washed with water, dried over anhydrous sodium sulfate, and evaporated. The residual oil was dissolved in dichloromethane and filtered over Florisil. Removal of the solvents gave the product which was recrystallized from ether, to give 2-bromo-4'-chloro-2'-(2-dimethylamino-6-fluorobenzoyl) acetanilide as yellow rods.

EXAMPLE 10

2-bromo-4'-chloro-2'-(2-fluoro-6-methoxybenzoyl)acetanilide

A solution of 10 g. (0.0456 mole) of bromoacetyl bromide in 20 ml. of benzene was added dropwise to a solution of 10.65 g. (0.038 mole) of 2-amino-5-chloro-2'-fluoro-6'-methoxybenzophenone in 50 ml. of benzene. The mixture was heated under reflux for 3 hrs. then evaporated to approximately ⅓ its volume under reduced pressure. 2-bromo-4'-chloro-2'-(2-fluoro - 6 - methoxybenzoyl)-acetanilide was obtained by filtration and recrystallized from methanol. Recrystallization from a mixture of dichloromethane/hexane gave this product as white prisms.

EXAMPLE 11

2-bromo-2'-(2,6-difluorobenzoyl)acetanilide

A solution of 2.6 g. (0.013 mole) of bromoacetyl bromide in 5 ml. of benzene was added to a solution of 2.5 g. (0.011 mole) of 2-amino-2',6'-difluorobenzophenone in 25 ml. of benzene. The mixture was heated under reflux for 3 hrs. and then approximately 25 ml. of benzene was removed by distillation. A mixture of ether/pet. ether was added and the product was obtained by filtration. The precipitate was dissolved in dichloromethane and filtered through a small amount of Florisil. Dichloromethane was used as the eluant and gave, after removal of solvent and recrystallization of the residue from a mixture of dichloromethane and petrol (B.P. 30–60°), 2-bromo-2'-(2,6-difluorobenzoyl)acetanilide.

EXAMPLE 12

2-amino-4'-chloro-2'-(2,6-difluorobenzoyl)-acetanilide

A solution of 14.5 g. of 2-bromo-4'-chloro-2'-(2,6-difluorobenzoyl)acetanilide in 250 ml. of dichloromethane was treated with 400 ml. of anhydrous liquid ammonia and allowed to stand overnight. The mixture was washed with water, dried over anhydrous sodium sulfate and evaporated. The residue was crystallized from a mixture of dichloromethane/hexane to give 2-amino - 4' - chloro-2'-(2,6-difluorobenzoyl)acetanilide as pale yellow prisms.

EXAMPLE 13

2-amino-4'-chloro-2'-(2-fluoro-6-methylthiobenzoyl)acetanilide

A solution of 11.4 g. of 2-bromo-4'-chloro-2'-(2-fluoro-6-methylthiobenzoyl)acetanilide in 100 ml. of dichloromethane was treated with 100 ml. of anhydrous liquid ammonia and allowed to stand overnight. The dichloromethane solution was then washed with water, dried over anhydrous sodium sulfate and evaporated. The residue was dissolved in benzene and chromatographed over 250 g. of silica. The benzene forerun was discarded and the eluant was changed to ethyl acetate. Removal of the solvent and recrystallization of the residue from a mixture of dichloromethane and hexane gave 2-amino-4'-chloro-2'-(2-fluoro-6-methylthiobenzoyl)acetanilide as pale yellow prisms.

EXAMPLE 14

2-amino-4'-chloro-2'-(2-dimethylamino-6-fluorobenzoyl)acetanilide

A solution of 16.2 g. of 2-bromo-4'-chloro-2'-(2-dimethylamino-6-fluorobenzoyl)acetanilide in 100 ml. of dichloromethane was poured into 300 ml. of anhydrous liquid ammonia and allowed to stand overnight. The dichloromethane solution was washed with water, dried and evaporated to give the product 2-amino-4'-chloro-2'-(2-dimethylamino-6-fluorobenzoyl)acetanilide as a semicrystalline mass. The product was recrystallized for a mixture of dichloromethane/hexane to give the product as yellow rods.

EXAMPLE 15

2-amino-4'-chloro-2'-(2-fluoro-6-methoxybenzoyl)acetanilide

A solution of 10.3 g. of 2-bromo-4'-chloro-2'-(2-fluoro-6-methoxybenzoyl)acetanilide in 150 ml. of dichloromethane was poured into 150 ml. of anhydrous liquid ammonia and allowed to stand for 48 hrs. Dichloromethane (100 ml.) was added and the solution was washed with water, dried over anhydrous sodium sulfate and evaporated to give 2 - amino-4'-chloro-2'-(2-fluoro-6-methoxybenzoyl)-acetanilide. Recrystallization from a mixture of dichloromethane/hexane gave this product as white rods.

EXAMPLE 16

2-amino-2'-(2,6-difluorobenzoyl)acetanilide

A solution of 3 g. of 2-bromo-2'-(2,6-difluorobenzoyl)acetanilide in 50 ml. of dichloromethane was added to 80 ml. of anhydrous liquid ammonia. After the ammonia had evaporated the solution was washed with water, dried over anhydrous sodium sulfate and evaporated. The residue was recrystallized from a mixture of dichloromethane/hexane to give 2-amino-2'-(2,6-difluorobenzoyl)acetanilide as pale yellow rods.

EXAMPLE 17

7-chloro-1,3-dihydro-5-(2,6-difluorophenyl)-2H-1,4-benzodiazepin-2-one

A solution of 10 g. of 2-amino-4'-chloro-2'-(2,6-difluorobenzoyl)acetanilide in 200 ml. of ethanol was heated under reflux for 24 hr. The solution was evaporated and the residue was crystallized from a small amount of methanol to give the product 7-chloro-1,3-dihydro-5-(2,6-difluorophenyl) - 2H - 1,4 - benzodiazepin - 2 - one. Recrystallization from a mixture of dichloromethane/hexane gave this product as white prisms.

EXAMPLE 18

7-chloro-5-(2-fluoro-6-methylthiophenyl)-1,3-dihydro-2H-1,4-benzodiazepin-2-one

A solution of 8 g. of 2-amino-4'-chloro-2'-(2-fluoro-6-methylthiobenzoyl)acetanilide in 100 ml. of n-butanol was heated under reflux for 48 hr. The butanol was removed under reduced pressure and the residue was dissolved in dichloromethane, which was washed with water, dried over anhydrous sodium sulfate and evaporated. The residue was triturated with ethanol and filtered and evaporated. The residue was dissolved in benzene and filtered over silica. A benzene-ether (1:1 by volume mixture) was used as the eluant and gave after removal of solvent crude 7 - chloro-5-(2-fluoro-6-methylthiophenyl)-1,3 - dihydro-2H-1,4-benzodiazepin-2-one, as the product. Recrystallization of the product first from methanol and then from a mixture of dichloromethane and petrol gave the pure product as white prisms.

EXAMPLE 19

7-chloro-5-(2-dimethylamino-6-fluorophenyl)-1,3-dihydro-2H-1,4-benzodiazepin-2-one

A solution of 13.5 g. of 2-amino-4'-chloro-2'-(2-dimethylamino-6-fluorobenzoyl)acetanilide in 300 ml. of ethanol was heated under reflux for 64 hr., concentrated to a small volume and cooled. Filtration gave 7-chloro-5-(2-dimethylamino-6-fluorophenyl) - 1,3 - dihydro - 2H-1,4-benzodiazepin-2-one as a precipitate which was recrystallized from a mixture of dichloromethane/methanol to give the product as pale yellow prisms.

EXAMPLE 20

7-chloro-5-(2-fluoro-6-methoxyphenyl)-1,3-dihydro-2H-1,4-benzodiazepin-2-one

A solution of 8.68 g. of 2-amino-4'-chloro-2'-(2-fluoro-6-methoxybenzoyl) acetanilide in 225 ml. of ethanol was heated under reflux for 17 hrs., and then evaporated to dryness under reduced pressure. The residue was crystallized from ether and then from a mixture of dichloromethane and hexane to give 7-chloro-5-(2-fluoro-6-methoxyphenyl) - 1,3-dihydro-2H-1,4-benzodiazepin-2-one as white prisms.

EXAMPLE 21

5-(2,6-difluorophenyl)-1,3-dihydro-2H-1,4-benzodiazepin-2-one

A solution of 13.6 g. of 2-amino-2'-(2,6-difluorobenzoyl) acetanilide in 250 ml. of ethanol was heated under reflux for 17 hr., and then evaporated. Crystallization of the residue from ether gave the product 5-(2,6-difluorophenyl)-1,3-dihydro-2H-1,4-benzodiazepin-2-one.

EXAMPLE 22

7-chloro-5-(2,6-difluorophenyl)-1-methyl-1,3-dihydro-2H-1,4-benzodiazepin-2-one

A solution of 2.5 g. (0.008 mole) of 7-chloro-1,3-dihydro - 5 - (2,6-difluorophenyl)-2H-1,4-benzodiazepin-2-one in 20 ml. of N,N-dimethylformamide was treated with 2.2 ml. of a solution of sodium methoxide in methanol (0.00457 m./ml.; 0.00984 mole) and stirred at room temperature for 0.5 hr. The mixture was cooled in an ice bath and 1 ml. (0.0164 mole) of methyl iodide in 5 ml. of N,N-dimethylformamide was added. The reaction mixture was stirred for 1 hr. in the ice bath and then the temperature was raised to and maintained at 50° for 1 hr. The solvent was removed under reduced pressure and the residue was dissolved in dichloromethane. The solution was washed with water, dried over sodium sulfate, treated with charcoal, filtered and evaporated. The residue was crystallized from ether. The crude product was next dissolved in dichloromethane and filtered over Woelm, Grade 1 neutral alumina. Elution with ethyl acetate, removal of solvent, and recrystallization from mixture of dichloromethane/methanol gave 7-chloro-5-(2,6-difluorophenyl)-1-methyl-1,3-dihydro-2H - 1,4 - benzodiazepin-2-one as white rods.

EXAMPLE 23

7-chloro-1-(2-diethylaminoethyl)-5-(2,6-difluorophenyl)-1,3-dihydro-2H-1,4-benzodiazepin-2-one dihydrochloride

A solution of 4.0 g. (0.013 mole) of 7-chloro-1,3-dihydro-5-(2,6-difluorophenyl)-2H - 1,4 - benzodiazepin-2-one in 15 ml. of N,N-dimethylformamide was treated with 3.3 ml. of a solution of sodium methoxide in methanol (0.00469 m./ml.; 0.015 mole) and then with a toluene solution of 2-diethylaminoethyl chloride [prepared as follows: An ice cooled concentrated aqueous solution of 5.6 g. (0.0325 mole) of 2-diethylaminoethyl chloride hydrochloride was made basic with 10 N sodium hydroxide solution and extracted with toluene (2× 15 ml.). The toluene layers were combined, dried over sodium sulfate and filtered]. The reaction mixture was heated to and maintained at 60° for 3 hrs. and then taken to dryness under reduced pressure. The residue was dissolved in dichloromethane which was washed with water, dried and evaporated. The residue was dissolved in methanol and 7 ml. of 5.7 N ethanolic hydrogen chloride was added. The solution was evaporated to dryness and the residue recrystallized from a mixture of methanol and ether to give 7-chloro-1-(2-diethylaminoethyl) - 5 - (2,6-difluorophenyl)-1,3-dihydro-2H-1,4-benzodiazepin-2-one dihydrochloride as pale yellow prisms.

EXAMPLE 24

7 - chloro - 5 - (2,6-difluorophenyl)-1-(2-dimethylaminoethyl) - 1,3 - dihydro-2H-1,4-benzodiazepin-2-one (and dihydrochloride)

A solution of 4 g. (0.013 mole) of 7-chloro-1,3-dihydro-5-(2,6 - difluorophenyl)-2H-1,4-benzodiazepin-2-one in 15 ml. of N,N-dimethylformamide was treated with 3.3 ml.

of a solution of sodium methoxide in methanol (0.00469 m./ml.; 0.015 mole) and then with a toluene solution of 2-dimethylaminoethyl chloride prepared as described in Example 22. The reaction mixture was heated to and maintained at 60° for 3 hrs. when solvents were removed under reduced pressure. The residue was dissolved in ether which was washed with water and the product was then extracted into dilute hydrochloric acid (3× 100 ml.). The acid layers were combined, made basic with ammonia and the product was extracted into ether (3× 100 ml.). The organic layers were combined, washed with water, dried and filtered over 50 g. of Woelm Grade 1 neutral alumina. Ethyl acetate was used as the eluant and gave after removal of the solvent the product 7-chloro-5-(2,6-difluorophenyl)-1-(2 - dimethylaminoethyl)-1,3-dihydro-2H-1,4-benzodiazepin-2-one. Recrystallization from a mixture of dichloromethane/hexane gave the product as white prisms.

The product was dissolved in methanol and an excess of ethanolic hydrogen chloride was added. Solvents were removed under reduced pressure and the residue was recrystallized from a mixture of methanol/ether to give the dihydrochloride of this product as pale yellow prisms.

EXAMPLE 25

7-chloro-1-methyl-5-(2-fluoro-6-methoxyphenyl-1,3-dihydro-2H-1,4-benzodiazepin-2-one A solution of 2.7 g. (0.0085 mole) of 7-chloro-5-(2-fluoro-6-methoxyphenyl)-1,3-dihydro - 2H - 1,4-benzodiazepin-2-one in 15 ml. of N,N-dimethylformamide was treated with 2.2 ml. of a solution of sodium methoxide in methanol (0.00469 m./ml.: 0.01 mole). The mixture was cooled in an ice bath and a solution of 0.8 ml. (0.013 mole) of methyl iodide in 5 ml. of N,N-dimethylformamide was added. The mixture was allowed to warm to room temperature and stand overnight. Removal of the solvent under reduced pressure gave a residue which was dissolved in 100 ml. of dichloromethane. The solution was washed, dried and evaporated. The residue was dissolved in benzene and chromatographed over 50 g. of silica. The benzene and ether fractions were discarded. Ethyl acetate, gave after removal of solvent, the crude product which was recrystallized from a mixture of dichloromethane/hexane to give 7-chloro-1-methyl-5-(2-fluoro-6-methoxyphenyl)-1,3-dihydro-2H-1,4-benzodiazepin-2-one as colorless rods.

EXAMPLE 26

7-chloro-5-(2,6-difluorophenyl)-1,3,4,5-tetrahydro-2H-1,4-benzodiazepin-2-one

A mixture of 4.0 g. (0.013 mole) of 7-chloro-1,3-dihydro-5-(2,6 - difluorophenyl)-2H-1,4-benzodiazepin-2-one, 50 ml. of acetic acid, 25 ml. of water and 0.2 g. of platinum oxide was hydrogenated at room temperature and atmospheric pressure until hydrogen uptake ceased. The catalyst was removed by filtration and the filtrates were made basic with ammonium hydroxide. Dichloromethane was added and the precipitated product, which was insoluble in either phase, was recovered by filtration. Recrystallization from a mixture of chloroform and ethanol gave 7-chloro - 5 - (2,6-difluorophenyl)-1,3,4,5-tetrahydro-2H-1,4-benzodiazepin-2-one as white rods.

EXAMPLE 27

7-chloro-1-methyl-5-(2,6-difluorophenyl)-1,3,4,5-tetrahydro-2H-1,4-benzodiazepin-2-one Method 1.—A mixture of 3 g. (0.009 mole) of 7-chloro-5-(2,6 - difluorophenyl) - 1 - methyl-1,3-dihydro-2H-1,4-benzodiazepin-2-one, 40 ml. of acetic acid, 20 ml. of water and 0.2 g. of plantinum oxide was hydrogenated at room temperature and atmospheric pressure until hydrogen uptake stopped. The catalyst was removed by filtration and the filtrate was made basic with ammonium hydroxide. The product was extracted into dichloromethane which was then washed with water, dried over anhydrous sodium sulfate and evaporated. The residue was recrystallized from a mixture of dichloromethane/hexane to give 7-chloro - 1 - methyl-5-(2,6-difluorophenyl)-1,3,4,5-tetrahydro-2H-1,4-benzodiazepin-2-one as white prisms.

Method 2.—A solution of 1.3 g. (0.0042 mole) of 7-chloro-5-(2,6 - difluorophenyl)-1,3,4,5-tetrahydro-2H-1,4-benzodiazepin-2-one in 15 ml. of N,N-dimethylformamide was treated with 1.1 ml. of a solution of sodium methoxide in methanol (0.00469 m./ml.; 0.005 mole). The solution was stirred for 0.5 hr. and a solution of 0.7 g. (0.005 mole) of methyl iodide in 5 ml. of N,N-dimethylformamide was added. The reaction mixture was stirred at room temperature overnight (17 hr.), and then poured into 100 ml. of water. The product was extracted with dichloromethane (2× 50 ml.). The organic layers were combined, washed with water (2× 100 ml.), dried and evaporated. The residue was crystallized first from ether and then from a mixture of dichloromethane/hexane to give 7-chloro-1-methyl - 5 - (2,6 - difluorophenyl)-1,3,4,5-tetrahydro-2H-1,4-benzodiazepin-2-one as white prisms.

EXAMPLE 28

7-chloro-2,3-dihydro-5-(2,6-difluorophenyl)-1H-1,4-benzodiazepine

A solution of 0.025 g. (0.00814 mole) of 7-chloro-1,3-dihydro-5-(2,6 - difluorophenyl)-2H-1,4-benzodiazepin-2-one in 25 ml. of tetrahydrofuran was added to a solution of 0.062 g. (0.0163 mole) of lithium aluminum hydride in 25 ml. of tetrahydrofuran. The mixture was heated under reflux for 1 hr., and then allowed to stand at room temperature overnight. Excess lithium aluminum hydride was decomposed with water and a saturated solution of sodium bicarbonate was added until the precipitate coagulated. The mixture was filtered and the filtrate was washed with dichloromethane. The filtrate was evaporated to dryness and the residue was dissolved in 75 ml. of ether. The solution was extracted with 50 ml. of 1 N hydrochloric acid. The acid layer was washed with 50 ml. of ether, made basic with ammonium hydroxide and the product was extracted into ether. The ether fraction was washed with saturated brine, dried and evaporated. The residue was dissolved in a small amount of dichloromethane and chromatographed over a column of 50 g. of silica gel. Using ether as the eluant gave, after removal of the solvent 7-chloro-2,3-dihydro-5-(2,6-difluorophenyl)-1H-1,4-benzodiazepine.

EXAMPLE 29

7-chloro-5-(2,6-difluorophenyl)-1,3-dihydro-2H-1,4-benzodiazepin-2-one 4-oxide

A solution of peracetic acid was prepared by cooling 10 ml. of dichloromethane to 10°, adding 1.3 ml. of 90 percent hydrogen peroxide (0.0354 mole), 1 drop of concentrated sulfuric acid followed by the dropwise addition of 3.9 g. (0.0386 mole) of acetic anhydride. The reaction mixture was stirred at 10° for 15 min. and then at room temperature for 30 min.

The peracetic acid solution was then added dropwise to a solution of 9.9 g. (0.322 mole) of 7-chloro-1,3-dihydro-5-(2,6-difluorophenyl)-2H-1,4-benzodiazepin-2-one in 250 ml. of dichloromethane and the resulting mixture was stirred overnight at room temperature. The mixture was next heated to reflux for 8 hrs., cooled and filtered. The filtrates were washed with water (2×200 ml.) and filtered The filtrates were then washed with 3 N sodium hydroxide solution (1× 75 ml.) followed by 3 N hydrochloric acid (1× 75 ml.) and again filtered. The three precipitates were combined and recrystallized, first from a mixture of tetrahydrofuran and hexane and then from a mixture of tetrahydrofuran/ethanol to yield 7-chloro-5-(2,6-difluorophenyl)-1,3-dihydro-2H-1,4-benzodiazepin - 2 - one 4-oxide as white rods.

EXAMPLE 30

3-acetoxy-7-chloro-5-(2,6-difluorophenyl) - 1,3 - dihydro-2H-1,4-benzodiazepin-2-one and 1-acetyl-3-acetoxy-1,3-dihydro-7-chloro-5-(2,6-difluorophenyl) - 2H -1,4-benzodiazepin-2-one A solution of 6.3 g. of 7-chloro-5-(2,6-difluorophenyl)-1,3-dihydro-2H-1,4-benzodiazepin-2-one 4-oxide in 80 ml. of acetic anhydride was heated on a steambath for 75 min., cooled and filtered. The precipitate was recrystallized from a mixture of tetrahydrofuran/hexane to give 3-acetoxy - 7 - chloro-5-(2,6-difluorophenyl)1,3-dihydro-2H-1,4-benzodiazepin-2-one as white prisms.

The filtrates were evaporated to dryness under reduced pressure and the residue was crystallized from a mixture of ether/pet. ether (B.P. 30–60°). The precipitate was a mixture consisting mainly of 3-acetoxy-7-chloro-5-(2,6-difluorophenyl) 1',3-dihydro-2H-1,4-benzodiazepine-2-one and was discarded. The filtrates were concentrated to give crude 1-acetyl-3-acetoxy-1,3-dihydro - 7 - chloro-5-(2,6-difluorophenyl) - 2H-1,4-benzodiazepin-2-one. Recrystallizations from a mixture of dichloromethane/hexane gave this pure product as white needles.

EXAMPLE 31

7-chloro-5-(2,6-difluorophenyl)-3-hydroxy-1,3-dihydro-2H-1,4-benzodiazepin-2-one A suspension of 2.2 g. (0.006 mole) of 3-acetoxy-7-chloro-5-(2,6 - difluorophenyl) - 1,3 - dihydro-2H-1,4-benzodiazepin-2-one in 80 ml. of ethanol was treated at room temperature with a solution of 0.6 g. (0.015 mole) of sodium hydroxide in 86 ml. of water. The solution was stirred for 5 min. and then acidified with acetic acid. A portion of the ethanol was distilled and the solution was cooled and filtered. The precipitate was recrystallized from a mixture of dichloromethane/hexane to give 7-chloro-5-(2,6-difluorophenyl) - 3 - hydroxy-1,3-dihydro-2H-1,4-benzodiazepin-2-one as white rods.

EXAMPLE 32

7-chloro-5-(2,6-difluorophenyl)-2-methylamino-3H-1,4-benzodiazepine 4-oxide

A suspension of 5 g. of 7-chloro-5-(2,6-difluorophenyl)-1,3-dihydro-2H-1,4-benzodiazepin-2-one 4 oxide in 200 ml. of dry tetrahydrofuran was treated at 10° with a solution of 10 g. of methylamine in 100 ml. of dry tetrahydrofuran. The cold stirred mixture was kept under dry nitrogen and treated by the dropwise addition of a solution of 2.9 g. of titanium tetrachloride in 50 ml. of dry benzene. The reaction mixture was stirred in an ice bath for 1 hr., at room temperature for 2.5 hr., at 35° for 1 hr., allowed to stand overnight and was then treated with 10 ml. of water. Titanium dioxide was removed by filtration and the filtrates were evaporated under reduced pressure. The residue was recrystallized from a mixture of methanol, ether and petroleum ether to give 7-chloro-5-(2,6-difluorophenyl) - 2 - methylamino-3H-1,4-benzodiazepine 4-oxide as pale yellow prisms.

EXAMPLE 33

5-(2,6-difluorophenyl)-1,3-dihydro-7-nitro-2H-1,4-benzodiazepin-2-one

A solution of 2.0 g. (0.00735 mole) of 5-(2,6-difluorophenyl)-1,3-dihydro-2H-1,4-benzodiazepin-2-one in 14 ml. of concentrated sulfuric acid was cooled to −30° and treated with a solution of 0.82 g. (0.0081 mole) of potassium nitrate in 8 ml. of concentrated sulfuric acid. After the addition, the mixture was stirred at room temperature for 17 hrs. The reaction mixture was next cooled in a Dry Ice, acetone bath and treated with ice and ammonium hydroxide until the solution was basic (the internal temperature was <0° during the neutralization). The basic solution was extracted with dichloromethane, which was filtered, washed with saturated brine, dried over sodium sulfate and evaporated. The residue was recrystallized from methanol to give 5-(2,6-difluorophenyl)-1,3-dihydro-7-nitro-2H-1,4-benzodiazepin-2-one as the methanolate as pale yellow rods.

EXAMPLE 34

7-nitro-5-(2,6-difluorophenyl)-1-methyl-1,3-dihydro-2H-1,4-benzodiazepin-2-one

A solution of 1.6 g. (0.005 mole) of 5-(2,6-difluorophenyl) - 1,3-dihydro-7-nitro-2H-1,4-benzodiazepin-2-one in 15 ml. of N,N-dimethylformamide was treated with 1.3 ml. of a solution of sodium methoxide in methanol (0.00469 m./ml.:0.006 mole). The mixture was stirred for 0.5 hr. when 1.42 g. (0.01 mole) of methyl iodide was added. The reaction mixture was stirred for 4 hr., allowed to stand overnight and evaporated under reduced pressure to an oil. The residue was dissolved in dichloromethane, which was then washed with water, saturated brine, dried over sodium sulfate, extracted with Norite and evaporated. Recrystallization of the residue, first from a mixture of dichloromethane/hexane, then from methanol and finally from the dichloromethane/hexane mixture gave 7-nitro-5-(2,6-difluorophenyl)-1-methyl-1,3-dihydro-2H-1,4-benzodiazepin-2-one as pale yellow prisms.

EXAMPLE 35

5-(2,6-difluorophenyl)-1,3-dimethyl-7-nitro-1,3-dihydro-2H-1,4-benzodiazepin-2-one A solution of 4.2 g. (0.0132 mole) of 5-(2,6-difluorophenyl) - 1,3-dihydro-7-nitro-2H-1,4-benzodiazepin-2-one in 25 ml. of N,N-dimethylformamide was treated with 3.37 ml. of a solution of sodium methoxide in methanol (0.00469 m./ml.:0.0158 mole). The mixture was stirred for 0.5 hr. when 3.7 g. (0.0264 mole) of methyl iodide was added. After stirring overnight an additional 6.74 ml. (0.0316 mole) of the sodium methoxide solution was added followed by an additional 8 ml. (0.119 mole) of methyl iodide. The mixture was stirred for 2 hr. and then allowed to stand for 48 hr. Removal of solvents under reduced pressure gave a residue which was dissolved in dichloromethane. The organic solution was washed, dried and evaporated. The residue was next dissolved in benzene and chromatographed over 50 g. of Woelm Grade 1 neutral alumina. Ether was used as the eluant and gave, after removal of solvent the product 5-(2,6-difluorophenyl) - 1,3-dimethyl-7-nitro-1,3-dihydro-2H-1,4-benzodiazepin-2-one. This product was recrystallized first from a mixture of tetrahydrofuran/hexane and then from a mixture of dichloromethane/petrol (B.P. 30–60°) to give this product as pale yellow prisms.

EXAMPLE 36

2-amino-5,2'-dichloro-6'-fluorobenzophenone

A solution of 62.5 g. (0.48 mole) of m-chlorofluorobenzene in 100 ml. of dry tetrahydrofuran was added dropwise over a 20 minute period to a stirred solution of 0.5 mole of n-butyl lithium in 250 ml. of hexane and 250 ml. of tetrahydrofuran at −70°, under nitrogen. Stirring was continued at −70° for one hour followed by the portionwise addition of this mixture over 20 minutes, via a tygon tube, to a stirred solution of 91.6 g. (0.47 mole) of 6-chloro-2-methyl-3,1-benzoxazin-4-one, in 750 ml. of tetrahydrofuran at −70°, under nitrogen.

After stirring at −70° for 3 hours, 100 ml. of 6 N hydrochloric acid was added dropwise over 15 minutes and the reaction mixture was allowed to warm to room temperature. The solvents were removed in vacuo and the residue was partitioned between 200 ml. of saturated aqueous sodium chloride and 400 ml. of methylene chloride. A yellow solid separated which was removed by filtration. The filtrate was placed in a separatory funnel and the methylene chloride layer was separated, washed with saturated aqueous salt solution, dried over anhydrous sodium sulfate and evaporated under vacuo to leave a brown oil which crystallized upon scratching.

To the crude solid was added 400 ml. of 3 N hydrochloric acid and 200 ml. of absolute ethanol. The mixture was refluxed, with stirring, for 6 hours followed by distillation under vacuo until 200 ml. of solvent had been removed. The remaining mixture was basified with concentrated aqueous sodium hydroxide and extracted with methylene chloride. The extracts were washed with saturated salt water, dried over anhydrous sodium sulfate and evaporated in vacuo to leave a brown-red oil which crystallized upon scratching. The product was taken up in methylene chloride and filtered through a column of 50 g. of alumina (Woelm, activity grade 1) using one liter of methylene chloride as eluant. Evaporation of the solvent under vacuo left an orange solid.

The solid was dissolved in 200 ml. of ether and 200 ml. of petroleum ether (30–60°) was added. A flocullent precipitate separated which was removed by filtration. The filtrate was concentrated on a steam bath to a volume of about 100 ml. when crystallization began. Cooling and filtering gave 2-amino-5,2(-dichloro-6'-fluorobenzophenone as orange prisms.

EXAMPLE 37

2-bromo-4'-chloro-2'-(2-chloro-6-fluorobenzoyl) acetanilide

A solution of 8.5 g. (42 mmoles) of bromoacetyl bromide in 15 ml. of benzene was added dropwise over a period of 10 minutes to a stirred solution of 9.78 g. (34.5 mmoles) of 2-amino-5,2'-dichloro-6'-fluorobenzophenone in 75 ml. of benzene. The recation mixture was then refluxed for 4 hours as HBr gas is evolved. The benzene was then removed under vacuo and the residue taken up in 30 ml. of methylene chloride and filtered through a column of 50 g. of alumina (Woelm; activity grade 1) using 500 ml. of methylene chloride as eluant. Evaporation of the solvent left a yellow solid which was dissolved in 25 ml. of hot methylene chloride, 25 ml. of petroleum ether (30–60°) was added and the solution cooled. Filtration of the precipitated solid gave 2-bromo-4' - chloro-2'-(2-chloro-6-fluorobenzoyl)acetanilide as a pale yellow solid.

EXAMPLE 38

2-amino-4'-chloro-2'-(2-chloro-6-fluorobenzoyl) acetanilide

A solution of 20.25 g. of 2-bromo-4'-chloro-2'-(2-chloro-6-fluorobenzoyl)acetanilide in 250 ml. of methylene chloride was added with stirring to 300 ml. of liquid ammonia. The reaction mixture was stirred overnight as the ammonia evaporated. The methylene chloride solution was washed with water, dried over anhydrous sodium sulfate and evaporated to yield the crude product as a yellow solid. The solid was dissolved in 40 ml. of hot methylene chloride, 60 ml. of petroleum ether (30–60°) was added and the solution was then concentrated on the steam bath to 60 ml. Cooling and filtering gave the product 2 - amino - 4' - chloro-2'-(2-chloro-6-fluorobenzoyl) acetanilide. This product was recrystallized from ethanol to give pale yellow prisms.

EXAMPLE 39

7-chloro-5-(2-chloro-6-fluorophenyl)-1,3-dihydro-2H-1,4-benzodiazepin-2-one

A solution of 6.82 g. (20 mmoles) of 2-amino-4'-chloro - 2' - (2-chloro-6-fluorobenzoyl)acetanilide and 500 mg. of pyridine hydrochloride in 75 ml. of pyridine was refluxed for 20 hours. The pyridine was then removed under vacuo and the residue dissolved in 100 ml. of methylene chloride, washed with water, dried over anhydrous sodium sulfate and then concentrated to a volume of about 50 ml. The solution filtered through a column of 100 g. of alumina (Woelm; activity grade 1) using 700 ml. of methanol as eluant. Removal of the solvent under vacuo left an orange solid which was dissolved in 125 ml. of hot ethanol, treated with charcoal, filtered and evaporated to a volume of 75 ml. Cooling and filtration gave 7 - chloro - 5-(2-chloro-6-fluorophenyl)-1,3-dihydro-2H-1,4-benzodiazepin-2-one as pale yellow plates. Recrystallization from ethanol gave colorless plates.

EXAMPLE 40

A mixture of 63.8 g. (0.5 M) of p-chloro aniline and 114 g. (0.6 M) of p-toluenesulfonyl chloride in 400 ml. of pyridine was stirred at room temperature overnight. Most of the pyridine was then removed in vacuo. The residue was poured into 2 l. of ice-water and the tosylate extracted with ether. The ether was extracted with 1 N sodium hydroxide, aqueous hydrochloric acid, water, dried over magnesium sulfate and concentrated. The resulting oil was crystallized from ether, yielding tosylamido-4-chlorobenzene, M.P. 119.5–120.5°.

EXAMPLE 41

A mixture of 70.4 g. (0.25 M) of tosylamido-4-chlorobenzene, 700 ml. toluene and 0.3 mole of sodium methoxide in 200 ml. of methanol was stirred and refluxed for 1 hour. After distilling off most of the methanol, 47.3 ml. (0.5 M) of dimethyl sulfate was added. The stirring and refluxing was then continued for 5 additional hours. The precipitated sodium salt disappeared slowly. Excess dimethyl sulfate was destroyed by refluxing an additional 1½ hours with 400 ml. of 3 N sodium hydroxide. The phases were separated and the toluene distilled off leaving a white crystalline residue. Recrystallization from ethanol gave N-methyl-tosylamido-4-chlorobenzene, M.P. 92–93°.

EXAMPLE 42

61.5 g. (0.208 M) of N-methyl-tosylamido-4-chlorobenzene were added to 580 ml. of sulfuric acid (spec. gravity 1.74) at 105°. The mixture was stirred, heated up to 145° and kept at that temperature for 1 hour. After cooling, the solution was made strongly alkaline with 50 percent sodium hydroxide and the organic base extracted with ether. The organic extract was dried over potassium hydroxide pellets, concentrated and the residue distilled in vacuo to yield p-chloro-N-methylaniline, B.P. 74–75° at 0.7 mm. Hg.

EXAMPLE 43

To 13.3 g. of aluminum chloride and 20 ml. of dry benzene, in a 50 ml. three-neck flask equipped with reflux condenser, dropping funnel and stirrer, there was added 14.1 g. (0.1 M) of p-chloro-N-methylaniline, carefully and with cooling. After complete addition, the mixture was heated until reflux commenced and kept at that temperature for a short period. Freshly distilled ethyleneimine (4.3 g., 0.1 M) was then slowly distilled into the reaction vessel from a small flask attached to the former with a gas-inlet-tube by heating the flask. After the addition was complete, the reaction mixture was stirred for another thirty minutes and then poured on 200 g. of ice contained in a one-l. flask fitted with a condenser. Solid potassium hydroxide, 50 g., was added to the resulting solid in small portions, and the material was observed to go into solution. It was then cooled and extracted three times with benzene. The combined benzene extracts were dried over potassium hydroxide pellets and concentrated. The residue was distilled in vacuo through a ten-cm. Vigreux column yielding N-(p-chlorophenyl)-N-methyl-ethylenediamine, B.P. 126–127° at 0.05 mm. Hg.

EXAMPLE 44

2,6-dichloro-N-[2-(4-chloro-N-methylanilino)ethyl]benzamide

A solution of 39 g. (0.2 mole) of 2,6-dichlorobenzoic acid in 200 ml. thionyl chloride was refluxed 6.5 hours. The thionyl chloride was removed in vacuo. The crude acid chloride was dissolved in benzene and the solvent removed in vacuo again. To a stirred ice cooled solution of 36.8 g. (0.2 mole) of N-(p-chlorophenyl)-N-methyl-ethylenediamine in 100 ml. benzene was added the above acid chloride in 100 ml. benzene. Then 40 ml. of pyridine was added and the mixture was stirred at room temperature for 1.5 hours, then poured into ice cold dilute hydrochloric acid and extracted with methylene chloride. The organic layer was separated, washed with water and cold dilute potassium hydroxide, dried and concentrated in vacuo to dryness. The residue was crystallized from ether producing 2,6 - dichloro-N-[2-(4-chloro-N-methyl-anilino)ethyl]benzamide as the product. After recrystallization from acetone the product formed as colorless long prisms.

EXAMPLE 45

7-chloro-2,3-dihydro-5-(2,6-dichlorophenyl)-1-methyl-1H-1,4-benzodiazepine (A) Free base.—To a solution of 26.5 g. (74 mmoles) of 2,6-dichloro-N-[2-(4 - chloro-N-methyl-anilino)ethyl]benzamide in 120 ml. of phosphorus oxychloride was added 21 g. (0.148 mole) of phosphorus pentoxide. The reaction mixture was refluxed for 6 hours and then concentrated in vacuo to a small volume. The oily residue was poured onto ice. The mixture was made alkaline with 50 percent potassium hydroxide and extracted with methylene chloride. The organic layer was separated, washed with water, dried and concentrated in vacuo to dryness. The residue was crystallized from a mixture of acetone and ether and gave 7-chloro-2,3-dihydro-5-(2,6-dichlorophenyl)-1-methyl - 1H - 1,4-benzodiazepine as the product. After recrystallization from acetone, the product formed slightly yellow prisms.

(B) Hydrochloride.—The base was dissolved in methanol and acidified with methanolic hydrogen chloride. Ether was added slowly and the precipitated salt was separated by filtration. After recrystallization from a mixture of methanol and ether the hydrochloride salt of the above product formed yellow prisms.

EXAMPLE 46

7-chloro-5-(2,6-dichlorophenyl)-1,3-dihydro-1-methyl-2H-1,4-benzodiazepin-2-one

To a stirred solution of 4.4 g. (13 moles) of 7-chloro-2,3-dihydro-5-(2,6 - dichlorophenyl) - 1 - methyl-1H-1,4-benzodiazepine in 60 ml. of acetic acid was added 4.2 ml. of chromate reagent at room temperature. The chromate reagent was prepared according to the method of E. Djerassi et al., J. Org. Chem., 21, 1547 (1946). The stirring was continued for 1.5 hours. An insoluble precipitate formed and was separated by filtration. The filtrate was poured onto ice, made alkaline with ammonium hydroxide and extracted with methylene chloride. The organic layer was separated, dried and concentrated in vacuo to dryness. The residue was dissolved in ether and extracted with ice cold dilute hydrochloric acid. The organic layer was separated, dried and concentrated in vacuo to dryness. The residue was crystallized from ether and yielded 7-chloro-5-(2,6-dichlorophenyl)-1,3-dihydro-1-methyl-2H-1,4-benzodiazepin-2-one.

EXAMPLE 47

A suppository formulation was prepared containing the following ingredients:

| Ingredient: | Amount per 1.3 gm. suppository, grams |
|---|---|
| 5 - (2,6-difluorophenyl)-1,3-dimethyl-7-nitro-1,3-dihydro-2H-1,4-benzodiazepin-2-one | 0.025 |
| Wecobee M[1] | 1.230 |
| Carnauba wax | 0.045 |

[1] Cocoa butter-coconut derived fat having a melting point of 96° F. to 98° F. sold by E. F. Drew Co., New York, N.Y.

The procedure employed in preparing a suppository formulation was as follows:

The Wecobee M and the carnauba wax were melted in a suitable size glass lined container, mixed well and cooled to 45° C. 5-(2,6-difluorophenyl)-1,3-dimethyl-7-nitro-1,3-dihydro-2H-1,4-benzodiazepin-2-one, which had been reduced to a fine powder with no lumps, was added and stirred until completely and uniformly dispersed. The mixture was poured into suppository molds to yield suppositories having an individual weight of 1.3 gms. The suppositories were cooled and removed from molds. They were individually wrapped in wax paper for packaging.

EXAMPLE 48

A suppository formulation was prepared in the same manner as Example 47 except that 7-nitro-5-(2,6-difluorophenyl)-1-methyl-1,3-dihydro-2H-1,4-benzodiazepin-2-one was used as the active ingredient.

EXAMPLE 49

A suppository formulation was prepared in the same manner as Example 47 except that 7-chloro-5-(2,6-difluorophenyl)-3-hydroxy-1,3-dihydro-2H-1,4-benzodiazepin-2-one was used as the active ingredient.

EXAMPLE 50

A suppository formulation was prepared in the same manner as Example 47 except that 7-chloro-5-(2,6-difluorophenyl)-1-methyl-1,3-dihydro-2H-1,4-benzodiazepin - 2-one was used as the active ingredient.

EXAMPLE 51

A suppository formulation was prepared in the same manner as Example 47 except that 7-chloro-1,3-dihydro-5-(2,6 - difluorophenyl)-2H-1,4-benzodiazepin-2-one was used as the active ingredient.

EXAMPLE 52

A capsule formulation was prepared containing the following ingredients:

| Ingredient: | Amount per capsule, mg. |
|---|---|
| 5-(2,6-difluorophenyl)-1,3-dimethyl - 7 - nitro-1,3-dihydro-2H - 1,4 - benzoazephin-2-one | 25 |
| Lactose | 158 |
| Corn starch | 37 |
| Talc | 5 |
| Total weight | 225 |

The procedure employed in preparing the capsule was as follows:

5-(2,6-difluorophenyl) - 1,3 - dimethyl - 7 - nitro-1,3-dihydro-2H-1,4-benzodiazepin-2-one was mixed with the lactose and corn starch in a suitable mixer. The mixture was further blended by passing through a Fitzpatrick Comminuting Machine with a No. 1A screen with knives forward. The blended powder was returned to the mixer, the talc added and blended thoroughly. The mixture was then filled into No. 4 hard shell gelatin capsules on a Parke Davis capsulating machine.

EXAMPLE 53

A capsule was prepared in the same manner as Example 52 except that 7-nitro-5-(2,6-difluorophenyl-1-methyl- 1,3-dihydro-2H-1,4-benzodiazepin-2-one was used as the active ingredient.

EXAMPLE 54

A capsule was prepared in the same manner as Example 52 except that 7-chloro-5-(2,6-difluorophenyl)-3-hydroxy-1,3-dihydro-2H-1,4-benzodiazepin-2-one was used as the active ingredient.

EXAMPLE 55

A capsule was prepared in the same manner as Example 52 except that 7-chloro-5-(2,6-difluorophenyl)-1-methyl-1,3-dihydro-2H-1,4-benzodiazepin-2-one was used as the active ingredient.

EXAMPLE 56

A capsule was prepared in the same manner as Example 52 except that 7-chloro-1,3-dihydro-5-(2,6-difluorophenyl)-2H-1,4-benzodiazepin-2-one was used as the active ingredient.

EXAMPLE 57

A tablet formulation was prepared containing the following ingredients:

| Ingredient: | Amount per tablet, mg. |
|---|---|
| 5-(2,6 - difluorophenyl)-1,3-dimethyl-7-nitro-1,3-dihydro-2H-1,4-benzodiazepin-2-one | 10.0 |
| Lactose | 113.5 |
| Corn starch | 70.5 |
| Pregelatinized corn starch | 8.0 |
| Calcium stearate | 3.0 |
| Total weight | 205.0 |

The procedure employed in preparing a tablet was as follows:

5-(2,6-difluorophenyl)-1,3-dimethyl-7 - nitro-1,3-dihydro-2H-1,4-benzodiazepin-2-one was mixed with the lactose, corn starch and pregelatinized corn starch in a suitable size mixer. The mix was passed through a Fitzpatrick Comminuting Machine fitted with No. 1A screen and with knives forward. The mix was returned to the mixer and moistened with water to a thick paste. The moist mass was passed through a No. 12 screen and the moist granules were dried on paper lined trays at 110° F. The dried granules were returned to the mixer, the calcium stearate was added and mixed well. The granules were compressed at a tablet weight of 200 mg., using standard concave punches having a diameter of 5/16″.

EXAMPLE 58

A tablet was prepared in the same manner as Example 57 except that 7-nitro-5-(2,6-difluorophenyl)-1-methyl-1,3-dihydro-2H-1,4-benzodiazepin-2-one was used as the active ingredient.

EXAMPLE 59

A tablet was prepared in the same manner as Example 57 except that 7-chloro-5-(2,6-difluorophenyl)-3-hydroxy-1,3-dihydro-2H-1,4-benzodiazepin-2-one was used as the active ingredient.

EXAMPLE 60

A tablet was prepared in the same manner as Example 57 except that 7-chloro-5-(2,6-difluorophenyl)-1-methyl-1,3-dihydro-2H-1,4-benzodiazepin-2-one was used as the active ingredient.

EXAMPLE 61

A tablet was prepared in the same manner as Example 57 except that 7-chloro-1,3-dihydro-5-(2,6-difluorophenyl)-2H-1,4-benzodiazepin-2-one was used as the active ingredient.

EXAMPLE 62

5-(2,6 - difluorophenyl)-1,3-dimethyl-7-nitro-1,3-dihydro-2H-1,4-benzodiazepin-2-one was prepared in duplex ampuls, one containing the dry drug and the other containing Water for Injection, U.S.P.

| Dry fill ampul 5 cc., | mg. |
|---|---|
| 5-(2,6 - difluorophenyl) - 1,3 - dimethyl - 7 - nitro-1,3-dihydro - 2H - 1,4 - benzodiazepin - 2 - one | 25 |

A parenteral grade of 5-(2,6-difluorophenyl)-1,3-dimethyl- - 7 - nitro - 1,3 - dihydro-2H-1,4-benzodiazepin-2-one, fiber free, was filled into the ampul using a Diehl Mater electric filter. The ampules were sealed and sterilized at 255° F. for 2 hours.

| Special diluent per 5 cc. vial, | percent |
|---|---|
| Propylene glycol | 40 |
| Ethanol anhydrous | 10 |
| Benzyl alcohol | 1.5 |
| Water for injection | 48.5 |

The listed materials were mixed in a suitable size glass lined tank. The solution was made to volume, filtered thru an 02 Selas candle filter and filled into the multiple dose vials. The vials were stoppered and sealed with aluminum seals.

For use 4 ml. of this special diluent was added to the multiple dose vial containing the drug. This was then gently shaken until all of the drug was in solution. The finished solution was then ready for injection.

EXAMPLE 63

A parenteral formulation was formulated in the same manner as in Example 62 except that 7-nitro-5-(2,6-difluorophenyl) - 1 - methyl - 1,3 - dihydro - 2H - 1,4 - benzodiazepin-2-one was used as the active ingredient.

EXAMPLE 64

A parenteral formulation was formulated in the same manner as in Example 62 except that 7-chloro-5-(2,6-difluorophenyl) - 3 - hydroxy - 1,3 - dihydro - 2H - 1,4-benzodiazepin-2-one was used as the active ingredient.

EXAMPLE 65

A parenteral formulation was formulated in the same manner as in Example 62 except that 7-chloro-5-(2,6-difluorophenyl) - 1 - methyl - 1,3 - dihydro - 2H - 1,4-benzodiazepin-2-one was used as the active ingredient.

EXAMPLE 66

A parenteral formulation was formulated in the same manner as in Example 62 except that 7-chloro-1,3-dihydro - 5 - (2,6 - difluorophenyl) - 2H - 1,4 - benzodiazepin-2-one was used as the active ingredient.

EXAMPLE 67

7-chloro-5-(2,6-difluorophenyl)-1,3,4,5-tetrahydro-1,4-dimethyl-2H-1,4-benzodiazepin-2-one A solution of 0.7 g. (0.00217 M) of 7-chloro-1-methyl-5 - (2,6 - difluorophenyl) - 1,3,4,5 - tetrahydro - 2H - 1,4-benzodiazepin-2-one and 0.6 g. (0.0043 M) of methyl-iodide in 10 ml. of N,N-dimethylformamide was allowed to stand for 18 hrs. at room temperature, and was then warmed to 35–40° for 3 hrs. The solvent was removed under reduced pressure, and the remaining oil was dissolved in 50 ml. of dichloromethane which was then washed with 50 ml. of dilute ammonium hydroxide, 30 ml. of saturated brine solution, dried over anhydrous sodium sulfate and evaporated to dryness.

The resulting oil was dissolved in dichloromethane and filtered over 75 g. of silica gel using ether as the eluant. Removal of solvent yielded 7-chloro-5-(2,6-difluorophenyl) - 1,3,4,5-tetrahydro - 1,4 - dimethyl - 2H - 1,4 - benzodiazepin-2-one as the crude product. This crude product was crystallized first from ether and then from a mixture of petroleum ether and ether to yield the product as white plates.

What is claimed is:
1. A compound selected from the group consisting of compounds of the formula:

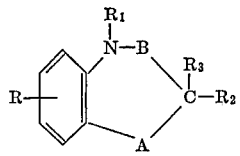

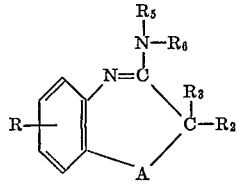

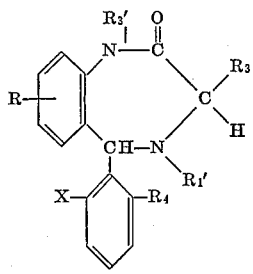

wherein A is selected from the group consisting of:

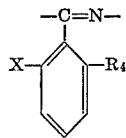 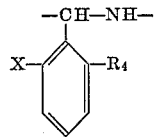 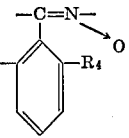
and

B is selected from the group consisting of

and —CH$_2$—; X is a halogen; R is selected from the group consisting of hydrogen, halogen, nitro and trifluoromethyl; R$_1$ is selected from the group consisting of hydrogen, lower alkyl, lower alkanoyloxy and

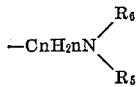

R$_2$ is selected from the group consiting of hydrogen, hydroxy, lower alkoxy, and lower alkanoyloxy; R$_3$ is selected from the group consisting of hydrogen and lower alkyl; R$_4$ is selected from the group consisting of halogen, hydroxy, lower alkoxy, lower alkyl amino, and thio-lower alkyl; R$_5$ and R$_6$ are selected from the group consisting of hydrogen and lower alkyl and R$_5$ and R$_6$ when taken together with their attached nitrogen atom form a pyrrolidino or piperidino ring; R$_1'$ and R$_3'$ are lower alkyl; n is an integer from 2 to 5 with the proviso that when R$_2$ is selected from the group consisting of lower alkoxy, lower alkanoyloxy, and hydroxy A is:

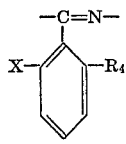

and pharmaceutically acceptable salts thereof.

2. A compound in accordance with claim 1, wherein said compound is:

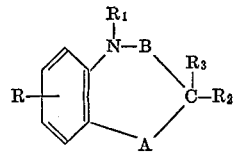

wherein A, B, R, R$_1$, R$_2$ and R$_3$ are as above.

3. A compound in accordance with claim 2, wherein A is:

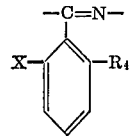

wherein X and R$_4$ are as above.

4. A compound in accordance with claim 3, wherein said compound has the formula:

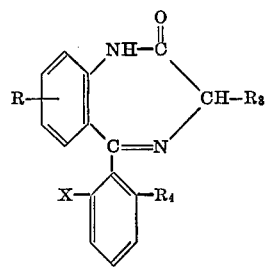

wherein R, R$_3$, R$_4$ and X are as above.

5. A compound in accordance with claim 4, wherein said compound is 7-chloro-1,3-dihydro-5-(2,6-difluorophenyl)-2H-1,4-benzodiazepin-2-one.

6. A compound in accordance with claim 4, wherein said compound is 7-chloro-5-(2-dimethylamino-6-fluorophenyl)-1,3-dihydro-2H-1,4-benzodiazepin-2-one.

7. A compound in accordance with claim 4, wherein said compound is 5-(2,6-difluorophenyl)-1,3-dihydro-7-nitro-2H-1,4-benzodiazepin-2-one.

8. A compound in accordance with claim 3, wherein said compound has the formula:

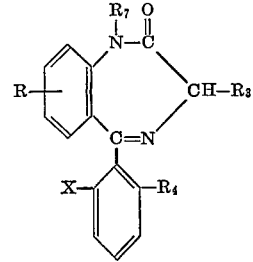

wherein R, R$_3$, R$_4$, and X are as above, and R$_7$ is a lower alkyl.

9. A compound in accordance with claim 8, wherein said compound is 7-chloro-5-(2,6-difluorophenyl)-1-methyl-1,3-dihydro-2H-1,4-benzodiazepin-2-one.

10. A compound in accordance with claim 8, wherein said compound is 7-nitro-5-(2,6-difluorophenyl)-1-methyl-1,3-dihydro-2H-1,4-benzodiazepin-2-one.

11. A compound in accordance with claim 8, wherein said compound is 5-(2,6-difluorophenyl)-1,3-dimethyl-7-nitro-1,3-dihydro-2H-1,4-benzodiazepin-2-one.

12. A compound in accordance with claim 8, wherein said compound is 7-chloro-5-(2,6-dichlorophenyl)-1,3-dihydro-1-methyl-2H-1,4-benzodiazepin-2-one.

13. A compound in accordance with claim 3, wherein said compound is 7-chloro-5-(2,6-difluorophenyl)-3-hydroxy-1,3-dihydro-2H-1,4-benzodiazepin-2-one.

14. A compound in accordance with claim 3, wherein said compound is 7-chloro-2,3-dihydro-5-(2,6-difluorophenyl)-1H-1,4-benzodiazepine.

15. A compound in accordance with claim 3, wherein said compound is 5-(2,6-difluorophenyl)-2,3-dihydro-7-nitro-1H-1,4-benzodiazepine.

16. A compound in accordance with claim 3, wherein said compound is 3-acetoxy-7-chloro-5-(2,6-difluorophenyl)-1,3-dihydro-2H-1,4-benzodiazepin-2-one.

17. A compound in accordance with claim 1, wherein said compound has the formula:

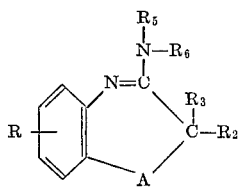

wherein A, R, $R_2$, $R_3$, $R_5$, and $R_6$ are as above.

18. A compound in accordance with claim 17, wherein A is:

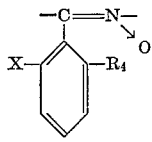

wherein X and $R_4$ are as above.

19. A compound in accordance with claim 18, wherein $R_2$ and $R_3$ are hydrogen.

20. A compound in accordance with claim 18, wherein said compound is 7-chloro-5-(2,6-difluorophenyl)-2-methylamino-3H-1,4-benzodiazepine 4-oxide.

21. A compound of the formula:

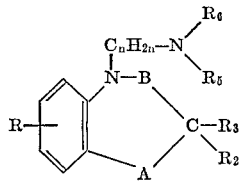

wherein A is selected from the group consisting of:

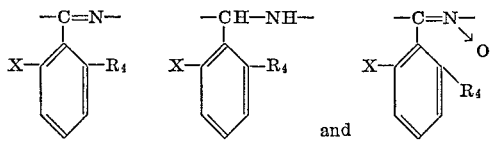

and

B is selected from the group consisting of

—$CH_2$—; $R_2$ is selected from the group consisting of hydrogen, hydroxy, lower alkoxy and lower alkanoyloxy; $R_3$ is selected from the group consisting of hydrogen and lower alkyl; $R_4$ is selected from the group consisting of halogen, hydroxy, lower alkoxy, lower alkyl amino, and thio-lower alkyl; $R_5$ and $R_6$ are selected from the group consisting of hydrogen and lower alkyl and $R_5$ and $R_6$ when taken together with their attached nitrogen atom form a pyrrolidino or piperidino ring; $n$ is an integer from 2 to 5 with the proviso that when $R_2$ is selected from the group consisting of lower alkoxy, lower alkanoyloxy, and hydroxy, A is:

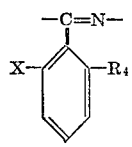

22. A compound in accordance with claim 21, wherein A is:

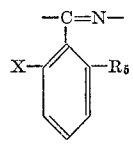

wherein X and $R_4$ are as above.

23. A compound in accordance with claim 22, wherein said compound is, 7-chloro-1-(2-diethylaminoethyl)-5-(2,6 - difluorophenyl) - 1,3-dihydro-2H-1,4-benzodiazepin-2-one.

24. A compound in accordance with claim 22, wherein said compound is, 7-chloro-5-(2,6-difluorophenyl)-1-(2-dimethylaminoethyl) - 1,3 - dihydro - 2H-1,4-benzodiazepin-2-one.

25. A compound having the formula:

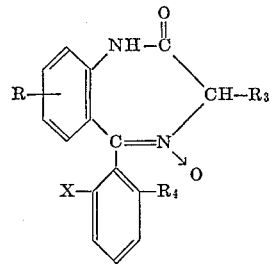

wherein R is selected from the group consisting of hydrogen, halogen, nitro, and trifluoromethyl; $R_3$ is selected from the group consisting of hydrogen and lower alkyl; $R_4$ is selected from the group consisting of halogen, hydroxy, lower alkoxy, lower alkyl amino, and thio-lower alkyl; and X is a halogen.

26. A compound in accordance with claim 25, wherein said compound is, 7-chloro-5-(2,6-difluorophenyl)-1,3-dihydro-2H-1,4-benzodiazepin-2-one 4-oxide.

27. A compound of the formula:

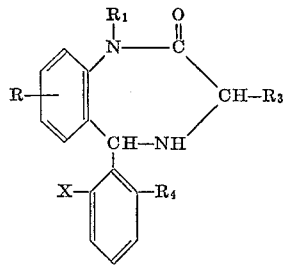

wherein R is selected from the group consisting of hydrogen, halogen, nitro and trifluoromethyl; $R_1$ is selected from the group consisting of hydrogen, lower alkyl, lower alkanoyloxy and

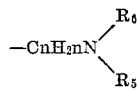

$R_3$ is selected from the group consisting of hydrogen and lower alkyl; $R_4$ is selected from the group consisting of halogen, hydroxy, lower alkoxy, lower alkyl amino, and thio-lower alkyl; X is a halogen; $R_5$ and $R_6$ are selected from the group consisting of hydrogen and lower alkyl and $R_5$ and $R_6$ when taken together with their attached nitrogen atom form a pyrrolidino or piperidino ring; and $n$ is an integer from 2 to 5.

28. A compound in accordance with claim 27, wherein said compound is, 7-chloro-5-(2,6-difluorophenyl)-1,3,4,5-tetrahydro-2H-1,4-benzodiazepin-2-one.

29. A compound in accordance with claim 27, wherein said compound is, 7-chloro-1-methyl-5-(2,6-difluorophenyl)-1,3,4,5-tetrahydro-2H-1,4-benzodiazepin-2-one.

30. A compound of the formula:

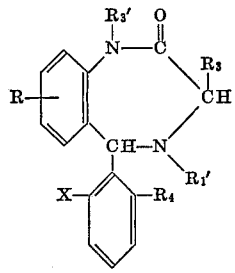

wherein R is selected from the group consisting of hydrogen, halogen, nitro and trifluoromethyl; X is a halogen; $R_1'$ and $R_3'$ are lower alkyl; and $R_3$ is selected from the group consisting of hydrogen and lower alkyl.

References Cited

UNITED STATES PATENTS

| | | |
|---|---|---|
| 2,893,992 | 7/1959 | Sternbach. |
| 3,109,843 | 11/1963 | Reeder et al. |
| 3,299,053 | 1/1967 | Archer et al. _ _ _ _ _ _ 260—239.3 |
| 3,371,085 | 2/1968 | Reeder et al. _ _ _ _ _ _ 260—239.3 |

OTHER REFERENCES

Fryer et al. "J. Med. Chem." vol. 7, pp. 386–9 (1964).

HENRY R. JILES, Primary Examiner

R. T. BOND, Assistant Examiner

U.S. Cl. X.R.

260—239.3 570, 572, 244; 424—244